United States Patent
Ramaswamy et al.

(10) Patent No.: US 9,609,034 B2
(45) Date of Patent: *Mar. 28, 2017

(54) METHODS AND APPARATUS FOR TRANSCODING METADATA

(71) Applicant: The Nielsen Company (US), LLC, New York, NY (US)

(72) Inventors: Arun Ramaswamy, Tampa, FL (US); William A. Feininger, Palm Harbor, FL (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/089,279

(22) Filed: Nov. 25, 2013

(65) Prior Publication Data

US 2014/0082220 A1 Mar. 20, 2014

Related U.S. Application Data

(63) Continuation of application No. 12/890,216, filed on Sep. 24, 2010, now Pat. No. 8,601,163, which is a
(Continued)

(51) Int. Cl.
*G06F 15/16* (2006.01)
*H04L 29/06* (2006.01)
(Continued)

(52) U.S. Cl.
CPC ............ *H04L 65/60* (2013.01); *H04H 20/95* (2013.01); *H04H 60/35* (2013.01); *H04H 60/73* (2013.01);
(Continued)

(58) Field of Classification Search
CPC ......... H04L 2209/608; G06F 17/30743; G06F 17/30; G06F 2221/0733; H04N 1/32352;
(Continued)

(56) References Cited

U.S. PATENT DOCUMENTS

| 4,230,990 A | 10/1980 | Lert, Jr. et al. |
| 4,647,974 A | 3/1987 | Butler et al. |

(Continued)

FOREIGN PATENT DOCUMENTS

| AU | 8976601 | 2/2002 |
| AU | 9298201 | 4/2002 |

(Continued)

OTHER PUBLICATIONS

International Bureau, "International Preliminary Examination Report," issued in connection with International Application Serial No. PCT/US03/14970, completed Aug. 21, 2004, 6 pages.

(Continued)

*Primary Examiner* — Benjamin M Thieu
(74) *Attorney, Agent, or Firm* — Hanley, Flight & Zimmerman, LLC

(57) ABSTRACT

Methods and apparatus for transcoding metadata are disclosed. Example methods disclosed herein to meter media content presented by a media device includes accessing first metadata accompanying media to be presented by the media device, the first metadata not being detectable by a metering device collecting audience measurement data associated the media device, transcoding the first metadata into second metadata having a format that is detectable by the metering device and capable of being inserted into at least one of an audio signal or a video signal corresponding to the media to presented by the media device, inserting the second metadata into the at least one of the audio signal or the video signal, and providing the at least one of the audio signal or the video signal with the inserted second metadata to the media device for presentation.

20 Claims, 8 Drawing Sheets

Related U.S. Application Data continuation of application No. 10/540,611, filed as application No. PCT/US03/14970 on May 13, 2003, now Pat. No. 7,827,312.

(60) Provisional application No. 60/436,714, filed on Dec. 27, 2002.

(51) Int. Cl.

| | | |
|---|---|---|
| *H04H 20/95* | (2008.01) | |
| *H04H 60/35* | (2008.01) | |
| *H04H 60/73* | (2008.01) | |
| *H04N 21/235* | (2011.01) | |
| *H04N 21/434* | (2011.01) | |
| *H04N 21/435* | (2011.01) | |
| *H04N 21/436* | (2011.01) | |
| *H04N 21/81* | (2011.01) | |

(52) U.S. Cl.
CPC .... *H04L 29/06027* (2013.01); *H04L 65/4076* (2013.01); *H04L 65/605* (2013.01); *H04N 21/235* (2013.01); *H04N 21/435* (2013.01); *H04N 21/4345* (2013.01); *H04N 21/4349* (2013.01); *H04N 21/43615* (2013.01); *H04N 21/8133* (2013.01)

(58) Field of Classification Search
CPC ....... H04N 2201/3233; H04N 21/8358; H04N 21/4394; H04N 21/44008
USPC ............... 709/244, 246, 223, 217; 382/100; 713/176
See application file for complete search history.

(56) References Cited

U.S. PATENT DOCUMENTS

| | | | |
|---|---|---|---|
| 4,677,466 A | 6/1987 | Lert, Jr. et al. | |
| 4,697,209 A | 9/1987 | Kiewit et al. | |
| 4,745,468 A | 5/1988 | Von Kohorn | |
| 4,876,592 A | 10/1989 | Von Kohorn | |
| 4,876,736 A | 10/1989 | Kiewit | |
| 4,926,255 A | 5/1990 | Von Kohorn | |
| 4,973,952 A | 11/1990 | Malec et al. | |
| 5,003,591 A * | 3/1991 | Kauffman | H04N 7/165 348/14.01 |
| 5,019,899 A | 5/1991 | Boles et al. | |
| 5,023,929 A | 6/1991 | Call | |
| 5,034,807 A | 7/1991 | Von Kohorn | |
| 5,057,915 A | 10/1991 | Von Kohorn | |
| 5,081,680 A | 1/1992 | Bennett | |
| 5,128,752 A | 7/1992 | Von Kohorn | |
| 5,227,874 A | 7/1993 | Von Kohorn | |
| 5,249,044 A | 9/1993 | Von Kohorn | |
| 5,283,734 A | 2/1994 | Von Kohorn | |
| 5,331,544 A | 7/1994 | Lu et al. | |
| 5,401,946 A | 3/1995 | Weinblatt | |
| 5,425,100 A | 6/1995 | Thomas et al. | |
| 5,481,294 A | 1/1996 | Thomas et al. | |
| 5,512,933 A | 4/1996 | Wheatley et al. | |
| 5,524,195 A | 6/1996 | Clanton, III et al. | |
| 5,543,856 A | 8/1996 | Rosser et al. | |
| 5,559,716 A | 9/1996 | Gaalswyk | |
| 5,574,962 A | 11/1996 | Fardeau et al. | |
| 5,579,124 A | 11/1996 | Aijala et al. | |
| 5,594,934 A | 1/1997 | Lu et al. | |
| 5,629,739 A | 5/1997 | Dougherty | |
| 5,659,366 A | 8/1997 | Kerman | |
| 5,666,293 A | 9/1997 | Metz et al. | |
| 5,719,634 A | 2/1998 | Keery et al. | |
| 5,734,413 A | 3/1998 | Lappington et al. | |
| 5,740,035 A | 4/1998 | Cohen et al. | |
| 5,815,671 A | 9/1998 | Morrison | |
| 5,841,978 A | 11/1998 | Rhoads | |
| 5,848,155 A | 12/1998 | Cox | |
| 5,850,249 A | 12/1998 | Massetti et al. | |
| 5,872,588 A | 2/1999 | Aras et al. | |
| 5,880,789 A | 3/1999 | Inaba | |
| 5,893,067 A | 4/1999 | Bender et al. | |
| 5,910,987 A * | 6/1999 | Ginter et al. | 705/52 |
| 5,918,223 A | 6/1999 | Blum et al. | |
| 5,930,369 A | 7/1999 | Cox et al. | |
| 5,933,789 A | 8/1999 | Byun et al. | |
| 5,956,716 A | 9/1999 | Kenner et al. | |
| 5,966,120 A | 10/1999 | Arazi et al. | |
| 5,974,299 A | 10/1999 | Massetti | |
| 5,974,396 A | 10/1999 | Anderson et al. | |
| 5,987,855 A | 11/1999 | Dey et al. | |
| 6,034,722 A | 3/2000 | Viney et al. | |
| 6,049,830 A | 4/2000 | Saib | |
| 6,055,573 A | 4/2000 | Gardenswartz et al. | |
| 6,061,793 A | 5/2000 | Tewfik et al. | |
| 6,088,659 A | 7/2000 | Kelley et al. | |
| 6,108,637 A | 8/2000 | Blumenau | |
| 6,115,654 A | 9/2000 | Eid et al. | |
| 6,154,209 A | 11/2000 | Naughton et al. | |
| 6,208,735 B1 | 3/2001 | Cox et al. | |
| 6,216,129 B1 | 4/2001 | Eldering | |
| 6,282,573 B1 | 8/2001 | Darago et al. | |
| 6,286,036 B1 | 9/2001 | Rhoads | |
| 6,286,140 B1 | 9/2001 | Ivanyi | |
| 6,298,348 B1 | 10/2001 | Eldering | |
| 6,308,327 B1 | 10/2001 | Liu et al. | |
| 6,310,956 B1 * | 10/2001 | Morito et al. | 380/201 |
| 6,327,619 B1 | 12/2001 | Blumenau | |
| 6,331,876 B1 | 12/2001 | Koster et al. | |
| 6,335,736 B1 | 1/2002 | Wagner et al. | |
| 6,363,159 B1 | 3/2002 | Rhoads | |
| 6,363,488 B1 * | 3/2002 | Ginter | G06F 21/10 348/E5.006 |
| 6,374,260 B1 | 4/2002 | Hoffert et al. | |
| 6,377,993 B1 * | 4/2002 | Brandt | G06F 11/0709 707/E17.107 |
| 6,389,055 B1 | 5/2002 | August et al. | |
| 6,400,827 B1 | 6/2002 | Rhoads | |
| 6,411,725 B1 | 6/2002 | Rhoads | |
| 6,421,445 B1 | 7/2002 | Jensen et al. | |
| 6,442,285 B2 * | 8/2002 | Rhoads et al. | 382/100 |
| 6,463,445 B1 * | 10/2002 | Suzuki et al. | |
| 6,487,564 B1 | 11/2002 | Asai et al. | |
| 6,505,160 B1 | 1/2003 | Levy et al. | |
| 6,512,836 B1 | 1/2003 | Xie et al. | |
| 6,513,014 B1 | 1/2003 | Walker et al. | |
| 6,519,509 B1 * | 2/2003 | Nierlich | H02J 3/008 700/286 |
| 6,522,771 B2 | 2/2003 | Rhoads | |
| 6,539,095 B1 | 3/2003 | Rhoads | |
| 6,546,556 B1 | 4/2003 | Kataoka et al. | |
| 6,553,178 B2 | 4/2003 | Abecassis | |
| 6,642,966 B1 | 11/2003 | Limaye | |
| 6,647,269 B2 | 11/2003 | Hendrey et al. | |
| 6,651,253 B2 | 11/2003 | Dudkiewicz et al. | |
| 6,654,480 B2 | 11/2003 | Rhoads | |
| 6,665,873 B1 | 12/2003 | Steenbeek et al. | |
| 6,671,732 B1 | 12/2003 | Weiner | |
| 6,675,383 B1 | 1/2004 | Wheeler et al. | |
| 6,683,966 B1 * | 1/2004 | Tian et al. | 382/100 |
| 6,710,815 B1 | 3/2004 | Billmaier et al. | |
| 6,714,683 B1 | 3/2004 | Tian et al. | |
| 6,714,684 B2 | 3/2004 | Yamaguchi et al. | |
| 6,750,985 B2 | 6/2004 | Rhoads | |
| 6,766,523 B2 | 7/2004 | Herley | |
| 6,795,972 B2 | 9/2004 | Rovira | |
| 6,804,379 B2 | 10/2004 | Rhoads | |
| 6,829,368 B2 | 12/2004 | Meyer et al. | |
| 6,853,634 B1 | 2/2005 | Davies et al. | |
| 6,871,323 B2 | 3/2005 | Wagner et al. | |
| 6,873,688 B1 | 3/2005 | Aarnio | |
| 6,941,275 B1 | 9/2005 | Swierczek | |
| 6,956,575 B2 | 10/2005 | Nakazawa et al. | |
| 6,968,315 B1 | 11/2005 | Nakisa | |
| 6,968,564 B1 | 11/2005 | Srinivasan | |
| 6,970,886 B1 | 11/2005 | Conwell et al. | |

(56) References Cited

U.S. PATENT DOCUMENTS

| | | |
|---|---|---|
| 6,996,213 B1 | 2/2006 | De Jong |
| 7,003,731 B1 | 2/2006 | Rhoads et al. |
| 7,007,166 B1* | 2/2006 | Moskowitz et al. ......... 713/176 |
| 7,032,178 B1 | 4/2006 | McKnight et al. |
| 7,050,603 B2 | 5/2006 | Rhoads et al. |
| 7,051,086 B2 | 5/2006 | Rhoads et al. |
| 7,058,697 B2 | 6/2006 | Rhoads |
| 7,082,434 B2 | 7/2006 | Gosselin |
| 7,095,871 B2* | 8/2006 | Jones ............... G06F 17/30876 382/100 |
| 7,143,949 B1 | 12/2006 | Hannigan |
| 7,158,943 B2 | 1/2007 | van der Riet |
| 7,171,018 B2 | 1/2007 | Rhoads et al. |
| 7,174,293 B2 | 2/2007 | Kenyon et al. |
| 7,181,042 B2* | 2/2007 | Tian ............... 382/100 |
| 7,185,201 B2 | 2/2007 | Rhoads et al. |
| 7,194,752 B1 | 3/2007 | Kenyon et al. |
| 7,197,156 B1 | 3/2007 | Levy |
| 7,215,280 B1 | 5/2007 | Percy et al. |
| 7,221,405 B2 | 5/2007 | Basson et al. |
| 7,227,972 B2 | 6/2007 | Brundage et al. |
| 7,254,249 B2 | 8/2007 | Rhoads et al. |
| 7,273,978 B2 | 9/2007 | Uhle |
| 7,317,716 B1 | 1/2008 | Boni et al. |
| 7,328,153 B2 | 2/2008 | Wells et al. |
| 7,346,512 B2 | 3/2008 | Li-Chun Wang et al. |
| 7,356,700 B2 | 4/2008 | Noridomi et al. |
| 7,363,278 B2 | 4/2008 | Schmelzer et al. |
| 7,369,678 B2 | 5/2008 | Rhoads |
| 7,421,723 B2 | 9/2008 | Harkness et al. |
| 7,443,292 B2 | 10/2008 | Jensen et al. |
| 7,451,317 B2* | 11/2008 | Oh et al. ............ 713/176 |
| 7,463,143 B2 | 12/2008 | Forr et al. |
| 7,505,889 B2 | 3/2009 | Salmonsen et al. |
| 7,519,658 B1 | 4/2009 | Anglin et al. |
| 7,592,908 B2 | 9/2009 | Zhang et al. |
| 7,623,823 B2 | 11/2009 | Zito et al. |
| 7,643,090 B2 | 1/2010 | Ramaswamy et al. |
| 7,689,823 B2 | 3/2010 | Shen et al. |
| 7,712,114 B2 | 5/2010 | Ramaswamy |
| 7,761,465 B1* | 7/2010 | Nonaka ............... G06F 21/10 707/770 |
| 7,827,312 B2 | 11/2010 | Ramaswamy et al. |
| 7,962,934 B1 | 6/2011 | Eldering et al. |
| 8,065,703 B2 | 11/2011 | Wilson et al. |
| 8,103,879 B2 | 1/2012 | Levy et al. |
| 8,176,322 B2 | 5/2012 | Lee et al. |
| 8,179,475 B2 | 5/2012 | Sandrew |
| 8,451,868 B2 | 5/2013 | Johnson et al. |
| 8,578,272 B2 | 11/2013 | Pantos et al. |
| 8,645,373 B2 | 2/2014 | Knight et al. |
| 8,706,685 B1 | 4/2014 | Smith et al. |
| 8,732,185 B1 | 5/2014 | Lynn et al. |
| 8,839,338 B2 | 9/2014 | Eyer |
| 8,856,869 B1 | 10/2014 | Brinskelle |
| 8,990,844 B2 | 3/2015 | Oh et al. |
| 9,197,421 B2 | 11/2015 | Besehanic |
| 9,209,978 B2 | 12/2015 | Besehanic |
| 9,210,208 B2 | 12/2015 | Besehanic |
| 2001/0031066 A1* | 10/2001 | Meyer et al. ............ 382/100 |
| 2001/0044851 A1 | 11/2001 | Rothman et al. |
| 2001/0044899 A1* | 11/2001 | Levy ............... 713/176 |
| 2002/0012443 A1* | 1/2002 | Rhoads et al. ............ 382/100 |
| 2002/0016969 A1 | 2/2002 | Kimble |
| 2002/0032734 A1 | 3/2002 | Rhoads |
| 2002/0033842 A1 | 3/2002 | Zetts |
| 2002/0047899 A1 | 4/2002 | Son et al. |
| 2002/0052885 A1 | 5/2002 | Levy |
| 2002/0053078 A1 | 5/2002 | Holtz et al. |
| 2002/0056094 A1 | 5/2002 | Dureau |
| 2002/0059218 A1 | 5/2002 | August et al. |
| 2002/0062382 A1 | 5/2002 | Rhoads et al. |
| 2002/0069037 A1 | 6/2002 | Hendrickson et al. |
| 2002/0069218 A1 | 6/2002 | Sull et al. |
| 2002/0083324 A1* | 6/2002 | Hirai ............... 713/176 |
| 2002/0091991 A1 | 7/2002 | Castro |
| 2002/0108125 A1 | 8/2002 | Joao |
| 2002/0111934 A1 | 8/2002 | Narayan |
| 2002/0112002 A1 | 8/2002 | Abato |
| 2002/0120925 A1 | 8/2002 | Logan |
| 2002/0124246 A1 | 9/2002 | Kaminsky et al. |
| 2002/0133705 A1* | 9/2002 | Tagashira ......... G11B 20/00086 713/176 |
| 2002/0138852 A1 | 9/2002 | Reynolds et al. |
| 2002/0144262 A1 | 10/2002 | Plotnick et al. |
| 2002/0144273 A1 | 10/2002 | Reto |
| 2002/0150247 A1 | 10/2002 | Linnartz et al. |
| 2002/0157112 A1 | 10/2002 | Kuhn |
| 2002/0162118 A1 | 10/2002 | Levy et al. |
| 2002/0174425 A1 | 11/2002 | Markel et al. |
| 2002/0194592 A1 | 12/2002 | Tsuchida et al. |
| 2002/0197063 A1 | 12/2002 | Cho |
| 2003/0021441 A1* | 1/2003 | Levy et al. .............. 382/100 |
| 2003/0039465 A1 | 2/2003 | Bjorgan et al. |
| 2003/0055949 A1 | 3/2003 | Coulombe et al. |
| 2003/0079131 A1 | 4/2003 | Reefman |
| 2003/0088674 A1 | 5/2003 | Ullman et al. |
| 2003/0093810 A1* | 5/2003 | Taniguchi ............... 725/112 |
| 2003/0105870 A1 | 6/2003 | Baum |
| 2003/0108200 A1 | 6/2003 | Sako |
| 2003/0115598 A1 | 6/2003 | Pantoja |
| 2003/0149890 A1 | 8/2003 | Shen et al. |
| 2003/0177488 A1 | 9/2003 | Smith et al. |
| 2003/0185232 A1 | 10/2003 | Moore et al. |
| 2003/0212710 A1 | 11/2003 | Guy |
| 2003/0233663 A1 | 12/2003 | Rao et al. |
| 2004/0003394 A1 | 1/2004 | Ramaswamy |
| 2004/0009763 A1 | 1/2004 | Stone et al. |
| 2004/0019690 A1 | 1/2004 | Cardno et al. |
| 2004/0025181 A1* | 2/2004 | Addington et al. ............ 725/58 |
| 2004/0037271 A1 | 2/2004 | Liscano et al. |
| 2004/0038692 A1 | 2/2004 | Muzaffar |
| 2004/0064319 A1* | 4/2004 | Neuhauser et al. ......... 704/273 |
| 2004/0073916 A1 | 4/2004 | Petrovic et al. |
| 2004/0073951 A1 | 4/2004 | Bae et al. |
| 2004/0088347 A1* | 5/2004 | Yeager ............... H04L 67/104 709/202 |
| 2004/0088556 A1* | 5/2004 | Weirauch ............... 713/193 |
| 2004/0125125 A1 | 7/2004 | Levy |
| 2004/0128514 A1 | 7/2004 | Rhoads |
| 2004/0137929 A1 | 7/2004 | Jones et al. |
| 2004/0146161 A1 | 7/2004 | De Jong |
| 2004/0153649 A1 | 8/2004 | Rhoads et al. |
| 2004/0156489 A1 | 8/2004 | Vishik et al. |
| 2004/0199387 A1 | 10/2004 | Wang et al. |
| 2004/0254887 A1 | 12/2004 | Jacoby |
| 2005/0028189 A1 | 2/2005 | Heine et al. |
| 2005/0033758 A1 | 2/2005 | Baxter |
| 2005/0058319 A1 | 3/2005 | Rhoads et al. |
| 2005/0086682 A1 | 4/2005 | Burges et al. |
| 2005/0138179 A1 | 6/2005 | Encarnacion et al. |
| 2005/0144004 A1 | 6/2005 | Bennett et al. |
| 2005/0152287 A1 | 7/2005 | Yokomitsu et al. |
| 2005/0177738 A1 | 8/2005 | Van Der Veen et al. |
| 2005/0188297 A1 | 8/2005 | Knight et al. |
| 2005/0192933 A1 | 9/2005 | Rhoads et al. |
| 2005/0193425 A1 | 9/2005 | Sull et al. |
| 2005/0204379 A1 | 9/2005 | Yamamori |
| 2005/0216346 A1 | 9/2005 | Kusumoto et al. |
| 2005/0234774 A1 | 10/2005 | Dupree |
| 2006/0026162 A1 | 2/2006 | Salmonsen et al. |
| 2006/0026431 A1 | 2/2006 | Campello De Souza |
| 2006/0031297 A1 | 2/2006 | Zuidema |
| 2006/0056625 A1 | 3/2006 | Nakabayashi et al. |
| 2006/0059277 A1 | 3/2006 | Zito et al. |
| 2006/0062426 A1* | 3/2006 | Levy ............... G06F 21/10 382/100 |
| 2006/0095401 A1 | 5/2006 | Krikorian et al. |
| 2006/0107195 A1 | 5/2006 | Ramaswamy et al. |
| 2006/0107302 A1 | 5/2006 | Zdepski |
| 2006/0136564 A1 | 6/2006 | Ambrose |
| 2006/0161635 A1 | 7/2006 | Lamkin et al. |
| 2006/0167747 A1 | 7/2006 | Goodman et al. |
| 2006/0168613 A1 | 7/2006 | Wood et al. |

(56) References Cited

U.S. PATENT DOCUMENTS

| | | |
|---|---|---|
| 2006/0195614 A1 | 8/2006 | Sena et al. |
| 2006/0195886 A1 | 8/2006 | Ashley |
| 2006/0212705 A1 | 9/2006 | Thommana et al. |
| 2006/0221173 A1 | 10/2006 | Duncan |
| 2006/0224798 A1 | 10/2006 | Klein et al. |
| 2006/0242325 A1 | 10/2006 | Ramaswamy et al. |
| 2006/0271977 A1 | 11/2006 | Lerman et al. |
| 2007/0006250 A1 | 1/2007 | Croy et al. |
| 2007/0016918 A1 | 1/2007 | Alcorn et al. |
| 2007/0055987 A1 | 3/2007 | Lu et al. |
| 2007/0074020 A1 | 3/2007 | Nishimura |
| 2007/0083611 A1 | 4/2007 | Farago et al. |
| 2007/0110089 A1 | 5/2007 | Essafi et al. |
| 2007/0112837 A1 | 5/2007 | Houh et al. |
| 2007/0118375 A1 | 5/2007 | Kenyon et al. |
| 2007/0118873 A1 | 5/2007 | Houh et al. |
| 2007/0124771 A1 | 5/2007 | Shvadron |
| 2007/0127717 A1 | 6/2007 | Herre et al. |
| 2007/0129952 A1 | 6/2007 | Kenyon et al. |
| 2007/0133223 A1 | 6/2007 | Fredley et al. |
| 2007/0136753 A1 | 6/2007 | Bovenschulte et al. |
| 2007/0136777 A1 | 6/2007 | Hasek et al. |
| 2007/0149114 A1 | 6/2007 | Danilenko |
| 2007/0157262 A1 | 7/2007 | Ramaswamy et al. |
| 2007/0162927 A1 | 7/2007 | Ramaswamy et al. |
| 2007/0186228 A1 | 8/2007 | Ramaswamy et al. |
| 2007/0186288 A1 | 8/2007 | Peterson et al. |
| 2007/0198738 A1 | 8/2007 | Angiolillo et al. |
| 2007/0201835 A1 | 8/2007 | Rhoads |
| 2007/0226760 A1 | 9/2007 | Neuhauser et al. |
| 2007/0250901 A1 | 10/2007 | McIntire et al. |
| 2007/0274523 A1 | 11/2007 | Rhoads |
| 2007/0276925 A1 | 11/2007 | La Joie et al. |
| 2007/0276926 A1 | 11/2007 | LaJoie et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0027734 A1 | 1/2008 | Zhao et al. |
| 2008/0028223 A1 | 1/2008 | Rhoads |
| 2008/0040354 A1 | 2/2008 | Ray et al. |
| 2008/0046499 A1 | 2/2008 | Cabrera et al. |
| 2008/0059160 A1 | 3/2008 | Saunders et al. |
| 2008/0065507 A1 | 3/2008 | Morrison et al. |
| 2008/0077956 A1 | 3/2008 | Morrison et al. |
| 2008/0082510 A1 | 4/2008 | Wang et al. |
| 2008/0082922 A1 | 4/2008 | Biniak et al. |
| 2008/0083003 A1 | 4/2008 | Biniak et al. |
| 2008/0104624 A1 | 5/2008 | Narasimhan et al. |
| 2008/0120661 A1 | 5/2008 | Ludvig et al. |
| 2008/0133223 A1 | 6/2008 | Son et al. |
| 2008/0133504 A1 | 6/2008 | Messer et al. |
| 2008/0134232 A1 | 6/2008 | Rhoads |
| 2008/0139182 A1 | 6/2008 | Levy et al. |
| 2008/0140573 A1 | 6/2008 | Levy et al. |
| 2008/0168503 A1 | 7/2008 | Sparrell |
| 2008/0184132 A1 | 7/2008 | Zato |
| 2008/0200999 A1 | 8/2008 | Hakansson |
| 2008/0209491 A1 | 8/2008 | Hasek |
| 2008/0219496 A1 | 9/2008 | Tewfik et al. |
| 2008/0219637 A1 | 9/2008 | Sandrew |
| 2008/0235077 A1 | 9/2008 | Harkness et al. |
| 2008/0235209 A1 | 9/2008 | Rathod et al. |
| 2008/0240490 A1 | 10/2008 | Finkelstein et al. |
| 2008/0249961 A1 | 10/2008 | Harkness et al. |
| 2008/0310629 A1 | 12/2008 | Van Der Veen et al. |
| 2009/0007169 A1 | 1/2009 | Headley et al. |
| 2009/0015599 A1 | 1/2009 | Bennett et al. |
| 2009/0070408 A1 | 3/2009 | White |
| 2009/0083417 A1 | 3/2009 | Hughes et al. |
| 2009/0086812 A1 | 4/2009 | Ducharme |
| 2009/0103887 A1 | 4/2009 | Choi et al. |
| 2009/0119723 A1 | 5/2009 | Tinsman |
| 2009/0129588 A1 | 5/2009 | Takakusu et al. |
| 2009/0133093 A1 | 5/2009 | Hodge |
| 2009/0150553 A1 | 6/2009 | Collart et al. |
| 2009/0158318 A1 | 6/2009 | Levy |
| 2009/0164564 A1 | 6/2009 | Willis |
| 2009/0228492 A1 | 9/2009 | Valdez et al. |
| 2009/0248886 A1 | 10/2009 | Tan et al. |
| 2009/0259325 A1 | 10/2009 | Topchy et al. |
| 2009/0265214 A1 | 10/2009 | Jobs et al. |
| 2009/0276313 A1 | 11/2009 | Wilhelm |
| 2009/0305680 A1 | 12/2009 | Swift et al. |
| 2009/0307061 A1 | 12/2009 | Monighetti et al. |
| 2009/0307084 A1 | 12/2009 | Monighetti et al. |
| 2010/0008586 A1 | 1/2010 | Meyer et al. |
| 2010/0009722 A1 | 1/2010 | Levy et al. |
| 2010/0023405 A1 | 1/2010 | Liu |
| 2010/0088583 A1 | 4/2010 | Schachter |
| 2010/0094897 A1 | 4/2010 | Sumrall et al. |
| 2010/0121936 A1 | 5/2010 | Liu et al. |
| 2010/0135638 A1 | 6/2010 | Mio |
| 2010/0172540 A1 | 7/2010 | Davis et al. |
| 2010/0174774 A1 | 7/2010 | Kern et al. |
| 2010/0226526 A1 | 9/2010 | Modro et al. |
| 2010/0241963 A1 | 9/2010 | Kulis et al. |
| 2010/0262711 A1 | 10/2010 | Bouazizi |
| 2010/0280641 A1 | 11/2010 | Harkness et al. |
| 2010/0306257 A1 | 12/2010 | Levy |
| 2010/0318600 A1 | 12/2010 | Furbeck |
| 2011/0016231 A1 | 1/2011 | Ramaswamy et al. |
| 2011/0030031 A1 | 2/2011 | Lussier et al. |
| 2011/0055314 A1 | 3/2011 | Rosenstein et al. |
| 2011/0078721 A1 | 3/2011 | Wang et al. |
| 2011/0123062 A1 | 5/2011 | Hilu |
| 2011/0145246 A1 | 6/2011 | Prager et al. |
| 2011/0145581 A1 | 6/2011 | Malhotra et al. |
| 2011/0154185 A1 | 6/2011 | Kern et al. |
| 2011/0173200 A1 | 7/2011 | Yang et al. |
| 2011/0196921 A1 | 8/2011 | Sylthe |
| 2011/0252118 A1 | 10/2011 | Pantos et al. |
| 2011/0320287 A1 | 12/2011 | Holt et al. |
| 2011/0321003 A1 | 12/2011 | Doig et al. |
| 2012/0023516 A1 | 1/2012 | Wolinsky et al. |
| 2012/0036350 A1 | 2/2012 | Kuno et al. |
| 2012/0045054 A1 | 2/2012 | Main et al. |
| 2012/0096546 A1 | 4/2012 | Dilley et al. |
| 2012/0124605 A1 | 5/2012 | Praden |
| 2012/0137015 A1 | 5/2012 | Sun |
| 2012/0209949 A1 | 8/2012 | Deliyannis et al. |
| 2012/0265735 A1 | 10/2012 | McMillan et al. |
| 2012/0284804 A1 | 11/2012 | Lindquist et al. |
| 2012/0308071 A1 | 12/2012 | Ramsdell et al. |
| 2012/0311126 A1 | 12/2012 | Jadallah et al. |
| 2013/0007298 A1 | 1/2013 | Ramaswamy et al. |
| 2013/0007794 A1 | 1/2013 | Besehanic et al. |
| 2013/0054972 A1 | 2/2013 | Thorwirth |
| 2013/0061275 A1 | 3/2013 | Seo et al. |
| 2013/0073960 A1 | 3/2013 | Eppolito et al. |
| 2013/0097285 A1 | 4/2013 | van Zwol et al. |
| 2013/0124747 A1 | 5/2013 | Harrang et al. |
| 2013/0166868 A1 | 6/2013 | Jarnikov et al. |
| 2013/0202150 A1 | 8/2013 | Sinha et al. |
| 2013/0205319 A1 | 8/2013 | Sinha et al. |
| 2013/0226942 A1 | 8/2013 | Denoual et al. |
| 2013/0231931 A1 | 9/2013 | Kulis et al. |
| 2013/0247078 A1 | 9/2013 | Nikankin et al. |
| 2013/0268623 A1 | 10/2013 | Besehanic et al. |
| 2013/0268630 A1 | 10/2013 | Besehanic et al. |
| 2013/0290508 A1 | 10/2013 | Besehanic et al. |
| 2013/0291001 A1 | 10/2013 | Besehanic et al. |
| 2013/0297410 A1 | 11/2013 | Oh et al. |
| 2013/0297737 A1 | 11/2013 | Wajs et al. |
| 2013/0311776 A1 | 11/2013 | Besehanic |
| 2013/0311780 A1 | 11/2013 | Besehanic |
| 2014/0105392 A1 | 4/2014 | Robert et al. |
| 2014/0229629 A1 | 8/2014 | Besehanic |
| 2014/0229970 A1 | 8/2014 | Besehanic |
| 2014/0244828 A1 | 8/2014 | Besehanic |
| 2014/0298365 A1 | 10/2014 | Matsubara et al. |

(56) References Cited

U.S. PATENT DOCUMENTS

| | | |
|---|---|---|
| 2014/0301386 A1 | 10/2014 | Harrenstien et al. |
| 2015/0222939 A1 | 8/2015 | Gallant et al. |
| 2016/0043916 A1 | 2/2016 | Ramaswamy et al. |

FOREIGN PATENT DOCUMENTS

| | | |
|---|---|---|
| AU | 2003230993 | 11/2003 |
| AU | 2006203639 | 8/2006 |
| BR | 112901 | 6/2003 |
| BR | 309598 | 2/2005 |
| CA | 2483104 | 4/2003 |
| CN | 1457600 | 11/2003 |
| CN | 1592906 | 3/2005 |
| CN | 1647160 | 7/2005 |
| CN | 101115124 | 1/2008 |
| EP | 769749 | 4/1997 |
| EP | 1176826 | 1/2002 |
| EP | 1349370 | 10/2003 |
| EP | 1406403 | 4/2004 |
| EP | 1307833 | 6/2006 |
| EP | 1745464 | 10/2007 |
| EP | 1853026 | 11/2007 |
| EP | 1704695 | 2/2008 |
| EP | 1504445 | 8/2008 |
| JP | 2002247610 | 8/2002 |
| JP | 2003524199 | 8/2003 |
| JP | 2004320752 | 11/2004 |
| WO | 95/27349 | 10/1995 |
| WO | 97/02672 | 1/1997 |
| WO | 00/04662 | 1/2000 |
| WO | 00/19699 | 4/2000 |
| WO | 01/19088 | 3/2001 |
| WO | 01/24027 | 4/2001 |
| WO | 01/31497 | 5/2001 |
| WO | 01/40963 | 6/2001 |
| WO | 01/46782 | 6/2001 |
| WO | 0146782 | 6/2001 |
| WO | 01/53922 | 7/2001 |
| WO | 01/75743 | 10/2001 |
| WO | 01/91109 | 11/2001 |
| WO | 02/05517 | 1/2002 |
| WO | 02/11123 | 2/2002 |
| WO | 02/15081 | 2/2002 |
| WO | 02/17591 | 2/2002 |
| WO | 02/19625 | 3/2002 |
| WO | 02/27600 | 4/2002 |
| WO | 02/37381 | 5/2002 |
| WO | 02/45034 | 6/2002 |
| WO | 02/061652 | 8/2002 |
| WO | 02/065305 | 8/2002 |
| WO | 02/065318 | 8/2002 |
| WO | 02/069121 | 9/2002 |
| WO | 03/009277 | 1/2003 |
| WO | 03/091990 | 11/2003 |
| WO | 03/094499 | 11/2003 |
| WO | 03/096337 | 11/2003 |
| WO | 2004010352 | 1/2004 |
| WO | 2004040416 | 5/2004 |
| WO | 2004040475 | 5/2004 |
| WO | 2004/061699 | 7/2004 |
| WO | 2005025217 | 3/2005 |
| WO | 2005064885 | 7/2005 |
| WO | 2005101243 | 10/2005 |
| WO | 2005111998 | 11/2005 |
| WO | 2006012241 | 2/2006 |
| WO | 2006025797 | 3/2006 |
| WO | 2007056531 | 5/2007 |
| WO | 2007056532 | 5/2007 |
| WO | 2008042953 | 4/2008 |
| WO | 2008044664 | 4/2008 |
| WO | 2008045950 | 4/2008 |
| WO | 2008110002 | 9/2008 |
| WO | 2008110790 | 9/2008 |
| WO | 2009011206 | 1/2009 |
| WO | 2009061651 | 5/2009 |
| WO | 2009064561 | 5/2009 |
| WO | 2010095320 | 8/2010 |
| WO | 2010127268 | 11/2010 |
| WO | 2012177866 | 12/2012 |
| WO | 2012177870 | 12/2012 |
| WO | 2012177872 | 12/2012 |
| WO | 2012177874 | 12/2012 |

OTHER PUBLICATIONS

International Searching Authority, "International Search Report," issued in connection with international Application Serial No. PCT/US03/14970, mailed Feb. 10, 2004, 1 page.

United States Patent and Trademark Office, "Advisory Action Before the Filing of an Appeal Brief," issued in connection with U.S. Appl. No. 10/540,611, mailed Jan. 22, 2010, 4 pages.

United States Patent and Trademark Office, "Final Office Action," issued in connection with U.S. Appl. No. 10/540,611, mailed Sep. 29, 2009, 20 pages.

United States Patent and Trademark Office, "Non-Final Office Action," issued in connection with U.S. Appl. No. 10/540,611, mailed Mar. 4, 2009, 19 pages.

United States Patent and Trademark Office, "Non-Final Office Action," issued in connection with U.S. Appl. No. 10/540,611, mailed Sep. 15, 2008, 14 pages.

United States Patent and Trademark Office, "Non-Final Office Action," issued in connection with U.S. Appl. No. 12/890,216, mailed Apr. 2, 2012, 21 pages.

United States Patent and Trademark Office, "Non-Final Office Action," issued in connection with U.S. Appl. No. 12/890,216, mailed Nov. 29, 2012, 18 pages.

United States Patent and Trademark Office, "Notice of Allowance," issued in connection with U.S. Appl. No. 10/540,611, mailed Jun. 22, 2010, 7 pages.

United States Patent and Trademark Office, "Notice of Allowance," issued in connection with U.S. Appl. No. 12/890,216, mailed Aug. 6, 2013, 14 pages.

Van Beek et al., "Metadata-Driven Multimedia Access," IEEE Signal Processing Magazine, Mar. 2003, vol. 20, No. 2, Institute of Electric and Electronic Engineers, Inc., New York, New York, USA, 13 pages.

Vetro et al., "Video Transcoding Architectures and Techniques: An Overview," IEEE Signal Processing Magazine, Mar. 2003, vol. 20, No. 2, Institute of Electric and Electronic Engineers, Inc., New York, New York, USA, 12 pages.

Patent Cooperation Treaty, "International Search Report and Written Opinion," issued in connection with International Application Serial No. PCT/US2010/033201, mailed Oct. 1, 2010 (16 pages).

Patent Cooperation Treaty, "International Preliminary Examination Report," issued in connection with International Application Serial No. PCT/US2003/031180, mailed Aug. 17, 2004 (4 pages).

Patent Cooperation Treaty, "International Preliminary Report on Patentability," issued in connection with International Application Serial No. PCT/US2005/026426, mailed Feb. 1, 2007 (9 pages).

Patent Cooperation Treaty, "International Search Report and Written Opinion," issued in connection with International Application Serial No. PCT/US2005/026426, mailed Aug. 18, 2006 (10 pages).

Patent Cooperation Treaty, "International Search Report and Written Opinion," issued in connection with International Application Serial No. PCT/US2009/061479, mailed May 26, 2010 (15 pages).

Patent Cooperation Treaty, "International Search Report and Written Opinion," issued in connection with International Application Serial No. PCT/US2009/061750, mailed Mar. 3, 2010 (10 pages).

Patent Cooperation Treaty, "International Search Report and Written Opinion," issued in connection with International Application Serial No. PCT/US2009/061827, mailed Mar. 15, 2010 (12 pages).

Patent Cooperation Treaty, "International Search Report," issued in connection with International Application Serial No. PCT/US2003/031180, mailed Jun. 8, 2004 (5 pages).

Shazam, "Shazam and VidZone Digital Media announce UK1s first fixed price mobile download service for music videos," http://www.shazam.com/music/web/newsdetail.html?nid=NEWS136, Feb. 11, 2008 (1 page).

(56) References Cited

OTHER PUBLICATIONS

Shazam, "Shazam launches new music application for Facebook fans," http://www.shazam.com/music/web/newsdetail.html?nid=NEWS135, Feb. 18, 2008 (1 page).
Shazam, "Shazam turns up the volume on mobile music," http://www.shazam.com/music/web/newsdetail.html?nid=NEWS137, Nov. 28, 2007 (1 page).
Shazam, Company summary outline and list of products, undated (1 page).
Stross, "Apple Wouldn't Rist Its Cool Over a Gimmick, Would It?," The New York Times, Nov. 14, 2009 (3 pages).
Stultz, "Handheld Captioning at Disney World Theme Parks," article retrieved on Mar. 8, 2013, http://goflorida.about.com/od/disneyworld/a/wdw_captioning.htm, (1 page).
Sullivan, "Google Cozies Up to SMBs for Digital Content," MediaPost News, Mar. 19, 2009 (3 pages).
USPTO, "Advisory Action," issued in connection with U.S. Appl. No. 11/618,245, mailed Sep. 30, 2009 (4 pages).
USPTO, "Final Office Action," issued in connection with U.S. Appl. No. 10/530,233, mailed Mar. 18, 2010 (23 pages).
USPTO, "Final Office Action," issued in connection with U.S. Appl. No. 11/618,245, mailed Jul. 21, 2009 (31 pages).
USPTO, "Non-Final Office Action," issued in connection with U.S. Appl. No. 10/530,233, mailed Sep. 16, 2009 (31 pages).
USPTO, "Non-Final Office Action," issued in connection with U.S. Appl. No. 11/618,245, mailed Feb. 5, 2009 (48 pages).
Wactlar et al., "Digital Video Archives: Managing Through Metadata" Building a National Strategy for Digital Preservation: Issues in Digital Media Archiving, http://www.informedia.cs.cmu.edu/documents/Wactlar-CLIR-final.pdf, Apr. 2002 (14 pages).
Wang, "An Industrial-Strength Audio Search Algorithm," Shazam Entertainment, Ltd., in Proceedings of the Fourth International Conference on Music Information Retrieval, Baltimore, Oct. 26-30, 2003 (7 pages).
CIPO, "Office Action," issued in connection with Canadian Application Serial No. 2,574,998, mailed Aug. 26, 2008 (4 pages).
CIPO, "Office Action," issued in connection with Canadian Application Serial No. 2,574,998, mailed Mar. 23, 2009 (5 pages).
CIPO, "Office Action," issued in connection with Canadian Application Serial No. 2,574,998, mailed Nov. 13, 2009 (10 pages).
Patent Cooperation Treaty, "International Search Report and Written Opinion ", issued in connection with International application No. PCT/US2012/043539, mailed Jan. 17, 2013, (9 pages).
Patent Cooperation Treaty, "International Search Report and Written Opinion ", issued in connection with International application No. PCT/US2012/043544, mailed Jan. 17, 2013, (15 pages).
Patent Cooperation Treaty, "International Search Report and Written Opinion ", issued in connection with International application No. PCT/US2012/043546, mailed Dec. 10, 2012, (6 pages).
U.S. Appl. No. 61/499,520, filed Jun. 21, 2011, (51 pages).
U.S. Appl. No. 61/568,631, filed Dec. 8, 2011, (80 pages).
USPTO, "Final Office Action," issued in connection with U.S. Appl. No. 11/618,245, mailed Oct. 26, 2011 (38 pages).
USPTO, "Non-Final Office Action," issued in connection with U.S. Appl. No. 11/618,245, mailed Apr. 28, 2011 (48 pages).
USPTO, "Requirement for Restriction," issued in connection with U.S. Appl. No. 10/530,233, mailed Jun. 10, 2009 (20 pages).
USPTO, "Non-Final Office Action," issued in connection with U.S. Appl. No. 13/341,661, mailed Mar. 19, 2013 (10 pages).
USPTO, "Non-Final Office Action," issued in connection with U.S. Appl. No. 13/181,147, mailed Nov. 21, 2012 (30 pages).
USPTO, "Restriction," issued in connection with U.S. Appl. No. 13/181,147, mailed Aug. 10, 2012 (4 pages).
PCT Application No. PCT/US12/43544, filed Jun. 21, 2012, (72 pages).
PCT Application No. PCT/US12/43539, filed Jun. 21, 2012, (50 pages).
PCT Application No. PCT/US12/43546, filed Jun. 21, 2012, (61 pages).
PCT Application No. PCT/US12/43535, filed Jun. 21, 2012, (83 pages).
U.S. Appl. No. 13/767,548, filed Feb. 14, 2013, (68 pages).
U.S. Appl. No. 13/778,108, filed Feb. 26, 2013, (66 pages).
U.S. Appl. No. 13/793,959, filed Mar. 11, 2013, (68 pages).
U.S. Appl. No. 13/793,974, filed Mar. 11, 2013, (58 pages).
U.S. Appl. No. 13/793,991, filed Mar. 11, 2013, (47 pages).
United States Patent and Trademark Office, "Office Action," issued in connection with U.S. Appl. No. 13/472,170 on Nov. 8, 2013, 17 pages.
United States Patent and Trademark Office, "Examiner's Answer to Appeal Brief", issued in connection with U.S. Appl. No. 13/181,147, dated Dec. 22, 2014 (34 pages).
United States Patent and Trademark Office, "Non-Final Office Action", issued in connection with U.S. Appl. No. 13/767,548, dated Feb. 3, 2015 (10 pages).
United States Patent and Trademark Office, "Non-Final Office Action", issued in connection with U.S. Appl. No. 13/793,959 dated Jan. 30, 2015 (11 pages).
United States Patent and Trademark Office, "Notice of Allowance", issued in connection with U.S. Appl. No. 13/793,983, dated Jan. 9, 2015 (12 pages).
United States Patent and Trademark Office, "Non-Final Office Action", issued in connection with U.S. Appl. No. 13/793,974, dated Feb. 18, 2015 (12 pages).
Mexican Patent Office, "Office Action", issued in connection with Mexican Patent Application No. MX/a/2014/000280, dated Jan. 21, 2015 (5 pages, English translation included).
United States Patent and Trademark Office, "Corrected Notice of Allowance", issued in connection with U.S. Appl. No. 13/472,170, dated Feb. 12, 2015 (5 pages).
United States Patent and Trademark Office, "Final Office Action", issued in connection with U.S. Appl. No. 13/472,170, dated Jun. 18, 2014 (18 pages).
U.S. Appl. No. 13/472,170, filed May 15, 2012, (72 pages).
United States Patent and Trademark Office, "Notice of Allowance", issued in connection with U.S. Appl. No. 13/472,170, dated Dec. 5, 2014 (12 pages).
United States Patent and Trademark Office, "Final Office Action", issued in connection with U.S. Appl. No. 13/443,596, dated Feb. 26, 2015 (25 pages).
United States Patent and Trademark Office, "Final Office Action", issued in connection with U.S. Appl. No. 13/793,991, dated Feb. 27, 2015 (21 pages).
United States Patent and Trademark Office, "Final Office Action", issued in connection with U.S. Appl. No. 13/181,147, dated Dec. 3, 2015 (10 pages).
Japanese Patent Office, "Notice of Reasons for Rejection", issued in connection with Japanese Patent Application No. P2014-517158, dated Jan. 26, 2016 (4 pages).
United States Patent and Trademark Office, "Notice of Allowance", issued in connection with U.S. Appl. No. 13/767,548, dated Dec. 4, 2015 (9 pages).
United States Patent and Trademark Office, "Non-Final Office Action", issued in connection with U.S. Appl. No. 13/778,108, dated Jan. 8, 2016 (13 pages).
United States Patent and Trademark Office, "Notice of Allowance", issued in connection with U.S. Appl. No. 13/793,959, dated Jan. 26, 2016 (9 pages).
United States Patent and Trademark Office, "Non-Final Office Action", issued in connection with U.S. Appl. No. 13/341,661, dated Feb. 1, 2016 (8 pages).
United States Patent and Trademark Office, "Non-Final Office Action", issued in connection with U.S. Appl. No. 14/922,918, dated Feb. 23, 2016 (17 pages).
Canadian Intellectual Property Office, "Office Action", issued in connection with Canadian Patent Application No. 2,773,567, dated Mar. 9, 2016 (4 pages).
United States Patent and Trademark Office, "Final Office Action", issued in connection with U.S. Appl. No. 13/455,961, dated Mar. 23, 2016 (17 pages).

(56) References Cited

OTHER PUBLICATIONS

United States Patent and Trademark Office, "Final Office Action", issued in connection with U.S. Appl. No. 13/443,596, dated Apr. 6, 2016 (25 pages).
European Patent Office, "Communication Pursuant to Article 94(3) EPS," issued in connection with application No. 12002599.4 on Mar. 4, 2016, (4 pages).
United States Patent and Trademark Office, "Final Office Action", issued in connection with U.S. Appl. No. 13/793,991, dated Apr. 8, 2016 (23 pages).
United States Patent and Trademark Office, "Notice of Allowance" issued in connection with U.S. Appl. No. 13/181,147, dated Feb. 18, 2016 (8 pages).
Canadian Intellectual Property Office, "Office Action," issued in connection with application No. CA 2,773,567, on Mar. 6, 2014, 2 pages.
State Intellectual Property Office of China, "First Office Action," issued in connection with application No. CN 201210105474.3, on Feb. 8, 2014, 15 pages.
United States Patent and Trademark Office, "Non-Final Office Action", issued in connection with U.S. Appl. No. 13/341,646, dated Jun. 5, 2014 (17 pages).
United States Patent and Trademark Office, "Final Office Action", issued in connection with U.S. Appl. No. 13/181,147, dated Mar. 10, 2014 (48 pages).
United States Patent and Trademark Office, "Final Office Action", issued in connection with U.S. Appl. No. 13/443,596, dated Apr. 9, 2014 (20 pages).
United States Patent and Trademark Office, "Final Office Action", issued in connection with U.S. Appl. No. 13/793,991, dated Apr. 11, 2014 (15 pages).
International Bureau, "International Preliminary Report on Patentability" issued in connection with International Application No. PCT/US2012/043544, dated Jan. 9, 2014 (9 pages).
IP Australia, "Examination Report", issued in connection with Australian Patent Application No. 2012272868, dated Jun. 27, 2014 (3 pages).
IP Australia, "Examination Report", issued in connection with Australian Patent Application No. 2012272874, dated Jun. 27, 2014 (3 pages).
IP Australia, "Examination Report", issued in connection with Australian Patent Application No. 2012272872, dated Jun. 24, 2014 (4 pages).
United States Patent and Trademark Office, "Notice of Allowance", issued in connection with U.S. Appl. No. 13/341,661 dated Jul. 8, 2014 (8 pages).
United States Patent and Trademark Office, "Final Office Action", issued in connection with U.S. Appl. No. 13/793,983, dated Jun. 6, 2014 (13 pages).
IP Australia, "Examination Report", issued in connection with Australian Patent Application No. 2012272876, dated Sep. 18, 2014 (4 pages).
IP Australia, "Examination Report", issued in connection with Australian Patent Application No. 2013203778, dated Aug. 21, 2014 (5 pages).
IP Australia, "Examination Report", issued in connection with Australian Patent Application No. 2013204488, dated Aug. 12, 2014 (5 pages).
United States Patent and Trademark Office, "Non-Final Office Action", issued in connection with U.S. Appl. No. 13/443,596, dated Sep. 25, 2014 (22 pages).
United States Patent and Trademark Office, "Notice of Allowance", issued in connection with U.S. Appl. No. 13/341,646, dated Nov. 3, 2014 (10 pages).
U.S. Appl. No. 13/341,646, filed Dec. 30, 2011, (78 pages).
U.S. Appl. No. 13/341,661, filed Dec. 30, 2011, (79 pages).
U.S. Appl. No. 13/181,147, filed Jul. 12, 2011, (41 pages).
United States Patent and Trademark Office, "Office Action," issued in connection with U.S. Appl. No. 13/793,983 on Nov. 8, 2013, 13 pages.

Patent Cooperation Treaty, "International Search Report and Written Opinion," issued in connection with International application No. PCT/ US2012/043535, dated Feb. 21, 2013, 15 pages.
United States Patent and Trademark Office, "Notice of Allowance," issued in connection with U.S. Appl. No. 13/341,661 on Sep. 23, 2013, 10 pages.
United States Patent and Trademark Office, "Office Action," issued in connection with U.S. Appl. No. 13/181,147 on Aug. 15, 2013, 46 pages.
United States Patent and Trademark Office, "Office Action," issued in connection with U.S. Appl. No. 13/443,596 on Nov. 21, 2013, 25 pages.
United States Patent and Trademark Office, "Office Action," issued in connection with U.S. Appl. No. 13/793,991 on Dec. 6, 2013, 21 pages.
United States Patent and Trademark Office, "Non-Final Office Action", issued in connection with U.S. Appl. No. 13/455,961, dated Dec. 5, 2014 (13 pages).
United States Patent and Trademark Office, "Non-Final Office Action", issued in connection with U.S. Appl. No. 13/793,991, dated Nov. 10, 2014 (19 pages).
U.S. Appl. No. 13/455,961, filed Apr. 25, 2012, (61 pages).
"Video: timed text tracks", Windows Internet Explorer, Microsoft, 2012, http://msdn.microsoft.com/en-us/library/ie/hh673566(v=vs.85).aspx, (6 pages).
Apple Inc. "HTTP Live Streaming Overview", Apr. 1, 2011, (36 pages).
Apple Inc. "Timed Metadata for HTTP Live Streaming", Apr. 28, 2011, (12 pages).
R. Pantos, ED., & W. May, Apple Inc. "HTTP Live Streaming: draft-pantos-http-live-streaming-07", Sep. 2011, (33 pages).
Eric Winkelman, "Timed Text Tracks and TV Services", Aug. 15, 2011, (5 pages).
U.S. Appl. No. 13/443,596, filed Apr. 10, 2012, (50 pages).
U.S. Appl. No. 13/793,983, filed Mar. 11, 2013, (68 pages).
United States Patent and Trademark Office, "Non-Final Office Action", issued in connection with U.S. Appl. No. 13/778,108, dated Feb. 27, 2015 (13 pages).
United States Patent and Trademark Office, "Non-Final Office Action", issued in connection with U.S. Appl. No. 13/341,646, dated Mar. 3, 2015 (7 pages).
Japanese Patent Office, "Notice of Reasons for Rejection", issued in connection with Japanese Patent Application No. P2014-517158, dated Mar. 3, 2015 (7 pages).
Mexican Patent Office, "Notice of Allowance", issued in connection with Mexican Patent Application No. MX/a/2014/000281, dated Feb. 25, 2015 (1 pages).
United States Patent and Trademark Office, "Notice of Allowance", issued in connection with U.S. Appl. No. 13/793,983, dated Mar. 16, 2015 (9 pages).
United States Patent and Trademark Office, "Notice of Allowance", issued in connection with U.S. Appl. No. 13/472,170, dated Mar. 26, 2015 (10 pages).
United States Patent and Trademark Office, "Final Office Action", issued in connection with U.S. Appl. No. 13/341,661, dated Mar. 26, 2015 (13 pages).
European Patent Office, "European Search Report", issued in connection with European Patent Application No. 12803215.8, dated Apr. 20, 2015 (9 pages).
Canadian Patent Office, "Office Action", issued in connection with Canadian Patent Application No. 2,840,092, dated Apr. 20, 2015 (4 pages).
United States Patent and Trademark Office, "Final Office Action", issued in connection with U.S. Appl. No. 13/455,961, dated May 20, 2015 (14 pages).
State Intellectual Property Office, "Notice of Allowance" issued in connection with Application No. 201210105474.3 , May 25, 2015, 5 pages.
United States Patent and Trademark Office, "Final Office Action", issued in connection with U.S. Appl. No. 13/793,974, dated May 28, 2015 (13 pages).

(56) References Cited

OTHER PUBLICATIONS

Canadian Intellectual Property Office, "Office Action", issued in connection with Canadian Patent Application No. 2,840,094, dated May 19, 2015 (4 pages).
European Patent Office, "European Search Report", issued in connection with European Patent Application No. 12802805.7, dated May 27, 2015 (8 pages).
European Patent Office, "European Search Report", issued in connection with European Patent Application No. 12802746.3, dated May 27, 2015 (9 pages).
United States Patent and Trademark Office, "Notice of Allowance", issued in connection with U.S. Appl. No. 13/341,646, dated Jun. 19, 2015 (9 pages).
Mexican Patent Office, "Notice of Allowance", issued in connection with Mexican Patent Application No. MX/a/2014/000280, dated Jun. 12, 2015 (1 page).
United States Patent and Trademark Office, "Notice of Allowance", issued in connection with U.S. Appl. No. 13/472,170, dated Jul. 7, 2015 (9 pages).
United States Patent and Trademark Office, "Notice of Allowance", issued in connection with U.S. Appl. No. 13/793,983, dated Jul. 7, 2015 (10 pages).
European Patent Office, "European Search Report" issued in connection with European Patent Application No. 12802202.7 dated May 28, 2015 (7 pages).
IP Australia, "Notice of Acceptance", issued in connection with Australian Patent Application No. 2012272868, dated Jul. 22, 2015 (2 pages).
CIPO, "Office Action," issued in connection with Canadian Application Serial No. 2,773,567, on Mar. 27, 2015, 6 pages.
United States Patent and Trademark Office, "Final Office Action", issued in connection with U.S. Appl. No. 13/767,548 dated Aug. 11, 2015 (13 pages).
United States Patent and Trademark Office, "Final Office Action", issued in connection with U.S. Appl. No. 13/778,108 dated Aug. 13, 2015 (17 pages).
IP Australia, "Notice of Acceptance", issued in connection with Australian Patent Application No. 2012272872 dated Aug. 6, 2015 (2 pages).
United States Patent and Trademark Office, "Final Office Action", issued in connection with U.S. Appl. No. 13/793,959, dated Sep. 11, 2015 (12 pages).
IP Australia, "Notice of Acceptance", issued in connection with Australian Patent Application No. 2012272874, dated Sep. 11, 2015 (2 pages).
United States Patent and Trademark Office, "Non-Final Office Action", issued in connection with U.S. Appl. No. 13/455,961, dated Sep. 24, 2015 (16 pages).
United States Patent and Trademark Office, "Non-Final Office Action", issued in connection with U.S. Appl. No. 13/793,974, dated Sep. 24, 2015 (14 pages).
United States Patent and Trademark Office, "Non-Final Office Action", issued in connection with U.S. Appl. No. 13/443,596, dated Oct. 20, 2015 (23 pages).
United States Patent and Trademark Office, "Non-Final Office Action", issued in connection with U.S. Appl. No. 13/793,991, dated Oct. 22, 2015 (20 pages).
State Intellectual Property Office of China, "Office Action", issued in connection with Chinese Patent Application No. 201280032737.0, dated Nov. 10, 2015 (5 pages).

"What is Jacked?," http://www.jacked.com/, retrieved on Dec. 3, 2009 (1 page).
Anderson, "Google to compete with Nielsen for TV-ratings info?," Ars Technica, Jun. 19, 2006 (3 pages).
Boehret, "Yahoo Widgets Lend Brains to Boob Tube," The Wall Street Journal, Mar. 25, 2009 (4 pages).
Claburn, "Google Researchers Propose TV Monitoring," Information Week, Jun. 7, 2006 (4 pages).
Evain, "TV-Anytime Metadata—A Preliminary Specification on Schedule!," EBU Technical Review, Sep. 2000 [http://www.ebu.ch/en/technical/trev/trev_284-contents.html, retrieved on Jul. 20, 2006] (15 pages).
Fink et al., "Social- and Interactive-Television Applications Based on Real-Time Ambient-Audio Identification," EuroITV, 2006 (10 pages).
Heuer et al., "Adaptive Multimedia Messaging based on MPEG-7—The M3-Box,", Proc. Second Int'l Symposium on Mobile Multimedia Systems Applications, Nov. 9-10, 2000 (8 pages).
Heussner, "Sound-Triggered Smart Phone Ads Seek You Out,"Adweek.com, http://www.adweek.com/news/advertising-branding/sound-triggered-smartphone-ads-seek-you-out-136901, Dec. 7, 2011 (3 page).
Hopper, "EBU Project Group P/META Metadata Exchange Standards," EBU Technical Review, Sep. 2000 [http://www.ebu.ch/en/technical/trev/trev_284-contents.html, retrieved on Jul. 20, 2006] (25 pages).
Kane, "Entrepreneur Plans On-Demand Videogame Service," The Wall Street Journal, Mar. 24, 2009 (2 pages).
Laven,"EBU Technical Review (Editorial)," No. 284, Sep. 2000 [http://www.ebu.ch/en/technical/trev/trev_284-contents.html, retrieved on Jul. 20, 2006] (3 pages).
Mulder, "The Integration of Metadata From Production to Consumer," EBU Technical Review, Sep. 2000 [http://www.ebu.ch/en/technical/trev/trev_284-contents.html, retrieved on Jul. 20, 2006] (5 pages).
United States Patent and Trademark Office, "Notice of Allowance", issued in connection with U.S. Appl. No. 13/341,661, dated Aug. 19, 2016 (9 pages).
United States Patent and Trademark Office, "Non-Final Office Action", issued in connection with U.S. Appl. No. 14/922,918, dated Sep. 9, 2016 (16 pages).
IP Australia, "Notice of Acceptance", issued in connection with Australian Patent Application No. 2013204488, dated Apr. 26, 2016 (3 pages).
IP Australia, "Examination Report", issued in connection with Australian Patent Application No. 2012272876, dated Apr. 26, 2016 (3 pages).
United States Patent and Trademark Office, "Final Office Action", issued in connection with U.S. Appl. No. 13/793,974, dated May 23, 2016 (14 pages).
United States Patent and Trademark Office, "Final Office Action", issued in connection with U.S. Appl. No. 13/778,108, dated May 23, 2016 (13 pages).
The State Intellectual Property Office of China, "Office Action", issued in connection with Chinese Patent Application No. 201280032740.2, dated May 31, 2016 (22 pages).
IP Australia, "Notice of Acceptance", issued in connection with Australian Patent Application No. 2012272876, dated Jun. 6, 2016 (2 pages).
The State Intellectual Property Office of China, "First Office Action", issued in connection with Chinese Patent Application No. 201280032738.5, dated Dec. 16, 2016 (13 pages).

\* cited by examiner

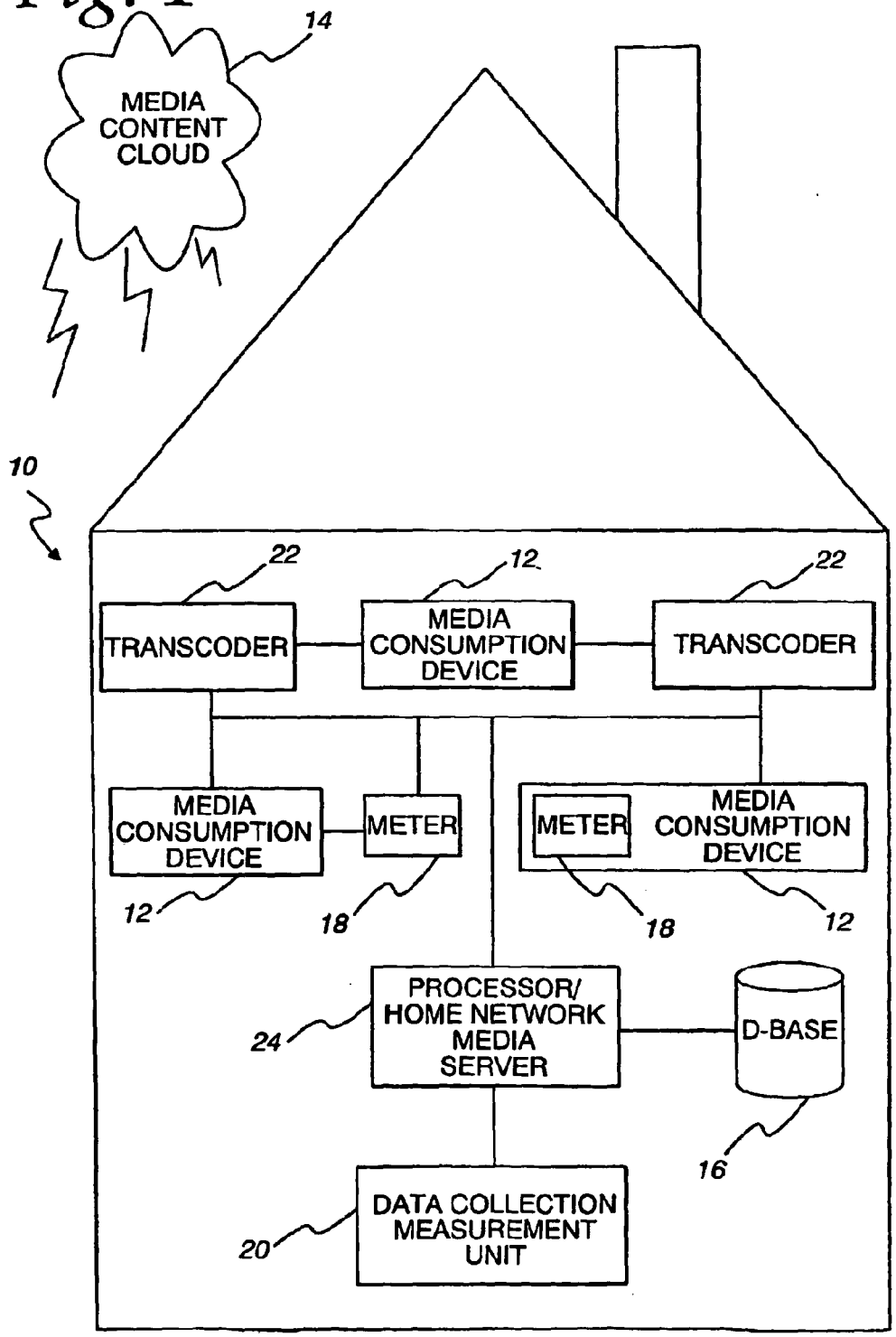

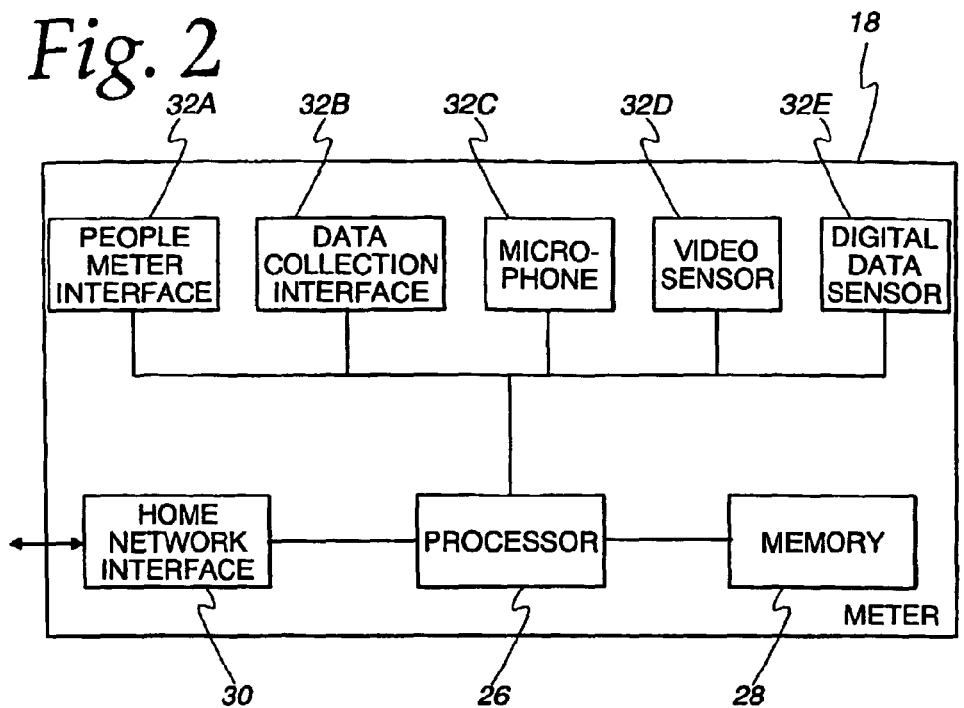
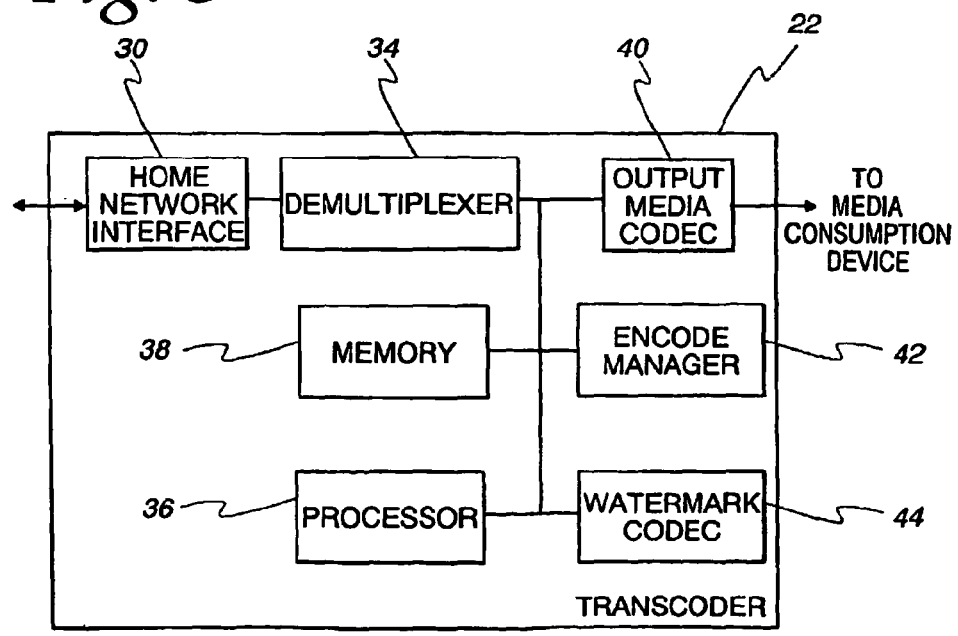

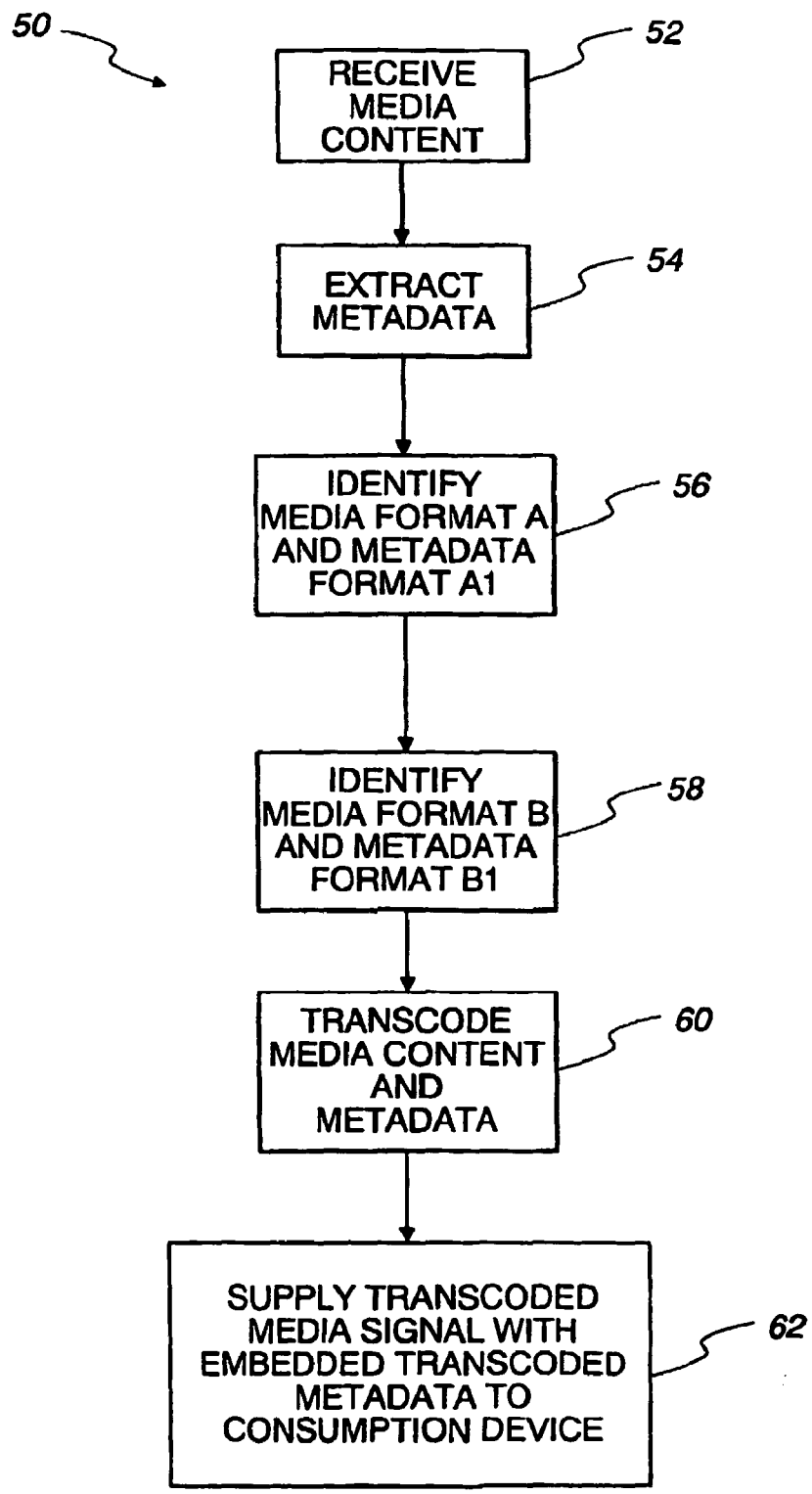

Fig. 5A

| BROADCAST METADATA (FORMAT B1) |
|---|
| Minor Channel Number: 5 |
| Major Channel Number Value: 10 |
| Transport ID: 50 |
| Program Name: "Friends" |
| Program Number: 100 |
| Program Description: "Comedy Sitcom" |
| SourceID: 1001 |
| Date/Time Stamp: 11/21/2002 13:12:50.900 |
| Transport Rate: 19380000 bps |
| Video Bitrate: 5000000 bps |
| Audio Bitrate: 384000 bps |
| Audio Sampling: 48000 Samples/Sec |
| Video Frame Rate: 29.97 |

Fig. 5B

| TRANSCODED METADATA (FORMAT B2) |
|---|
| Program Name: "Friends" |
| Program Number: "1" |
| Program Description: "Transcoded Comedy Sitcom" |
| Source ID: 1001 |
| Broadcast Date/TimeStamp: 11/21/2002 13:12:50.900 |
| Transcoded Date/TimeStamp: 12/13/2002 17:42:20.200 |
| Author: "John Doe" |
| DeviceID: 100 |
| HomeID: 25 |
| Format: "Windows Media" |
| Video Bitrate: 100000 bps |
| Audio Bitrate: 32000 bps |
| Audio Sampling: 32000 Samples Per Sec |
| Video Frame Rate: 15 fps |

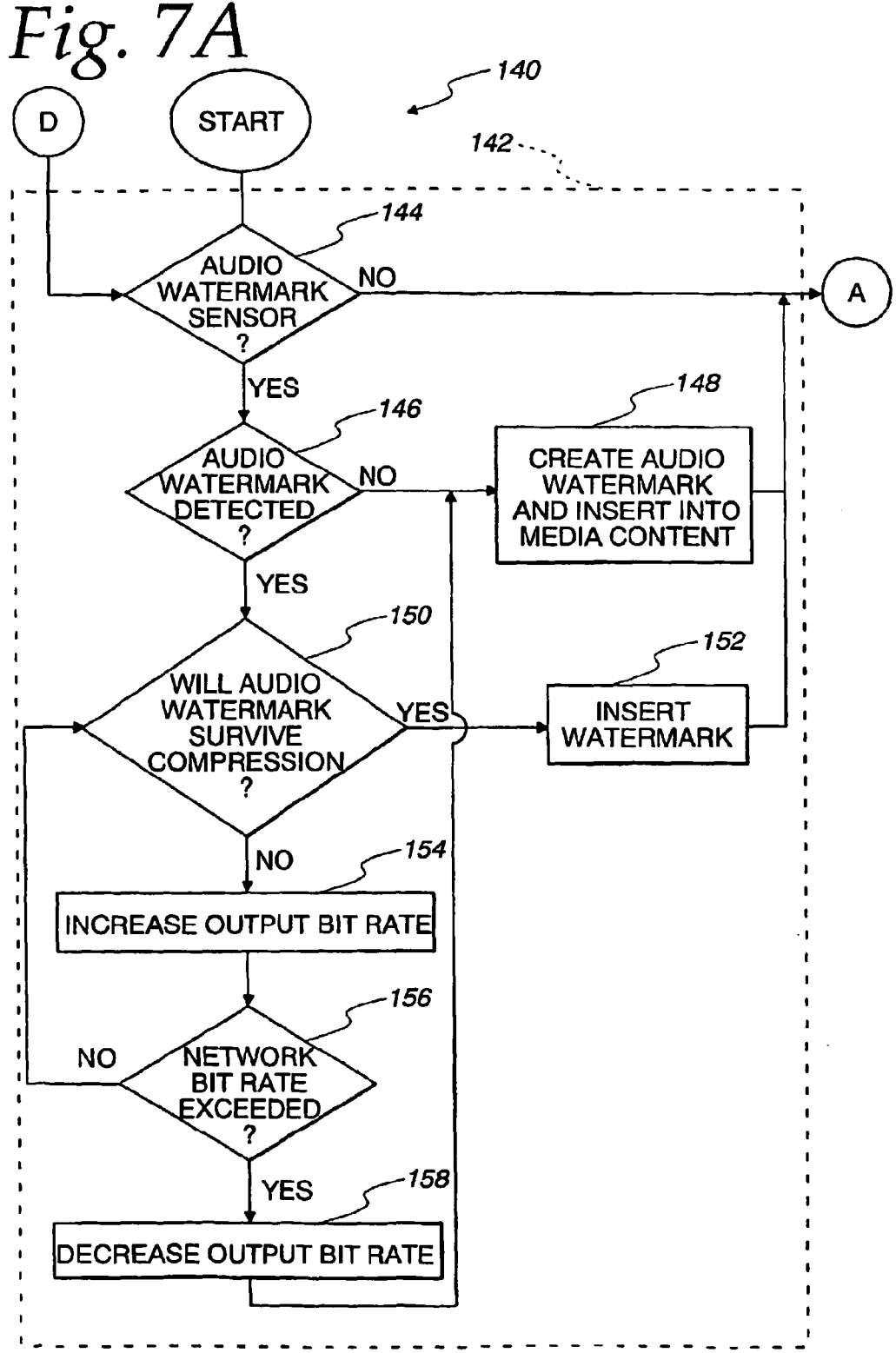

METHODS AND APPARATUS FOR TRANSCODING METADATA

RELATED APPLICATIONS

This patent is a continuation of U.S. patent application Ser. No. 12/890,216, entitled "Methods and Apparatus for Transcoding Metadata" and filed on Sep. 24, 2010, which is a continuation of U.S. patent application Ser. No. 10/540,611, entitled "Methods and Apparatus for Transcoding Metadata" and filed on Jun. 24, 2005, which is a U.S. national stage application of International Patent Application Serial No. PCT/US03/14970, entitled "Methods and Apparatus for Transcoding Metadata" and filed on May 13, 2003, which claims priority from U.S. Provisional Application Ser. No. 60/436,714, entitled "Transcoding of Metadata" and filed on Dec. 27, 2002. U.S. patent application Ser. Nos. 10/540,611 and 12/890,216, International Patent Application Serial No. PCT/US03/14970 and U.S. Provisional Application Ser. No. 60/436,714 are hereby incorporated by reference in their respective entireties.

FIELD OF THE DISCLOSURE

This disclosure relates generally to transcoding and, more particularly, to methods and apparatus for transcoding metadata.

BACKGROUND

Through the advancement of technology, media content is finding its way into homes by various non-traditional means. For instance, with the advent of broadband data connections, media content is now being supplied to homes via the Internet and other digital distribution sources as well as the traditional means of television and radio broadcasts. In addition, home networking standards such as HAVi and wired and wireless protocols such as IEEE 1394, IEEE 802.11, ultra wide band (UWB), cellular and pager networks and Bluetooth now allow a variety of different media consumption devices to communicate via a home network. Thus, media content received at a home can be distributed via a home network for display on any of the media consumption devices connected to the home network.

These advancements in home networking and media content delivery mechanisms provide users with enhanced access to media content, but also present new challenges for measuring the consumption of media content. More specifically, conventional media consumption meters are typically configured to measure media signals consumed in a particular format by a specific type of media consumption device. For example, television content consumption is measured using meters adapted to measure signals formatted for television. Likewise, computer content consumption is measured using meters adapted to measure signals formatted for a computer. Although this approach works well for media consumption devices that are not networked together, it does not allow for media consumption measurement in a home networked environment because of the manner in which media content is transmitted via a home network. Specifically, a home network typically comprises a variety of media consumption devices that are networked together and that are each adapted to process media provided in a particular format. To enable communication between the networked devices, home networks include one or more transcoders that transcode or convert media content signals transmitted via the home network between the various signal formats required by the networked devices. For example, a typical home network may be configured to include a television coupled to a computer with a transcoder disposed between the television and the computer. Media content that is received at the television and then selected for viewing at the computer is converted by the transcoder from a television format to a computer format so that the media content received at the television can be processed for display/viewing at the computer.

Unfortunately, the format conversion process performed by home network transcoders to enable communication between dissimilar devices also causes the corruption or loss of valuable audience measurement data. More specifically, data that enables media consumption measurement is embedded into media content by media content providers. The data is then extracted by media content consumption meters for use in determining the identity of the media content as well as other information about the media content which can then be reported for purposes of measuring consumption of that media content. However, home network transcoders are not adapted to convert this embedded data into a format suitable for use by downstream consumption measuring devices and, as a result, the embedded data is either stripped from the media content or corrupted during the transcoding process. Consequently, consumption of the converted media content cannot be accurately measured.

BRIEF DESCRIPTION OF THE DRAWINGS

FIG. 1 is a block diagram of an example home network having a set of transcoders that convert data embedded in media content for use by a set of media consumption metering devices.

FIG. 2 is a block diagram that depicts an example manner in which the transcoder of FIG. 1 may be implemented.

FIG. 3 is a block diagram that depicts an example manner in which one of the media consumption metering devices of FIG. 1 may be implemented.

FIG. 4 is a flow chart that depicts a method for performing metadata transcoding.

FIG. 5A is a diagram that depicts a set of metadata fields suitable for use with media content provided in a broadcast television format.

FIG. 5B is a diagram that depicts a set of metadata fields suitable for use with media content provided in a streaming media format.

FIGS. 7A-7C are flow charts that align to depict an example method for determining the sensing capabilities of a metering device.

DETAILED DESCRIPTION

Figure 6:
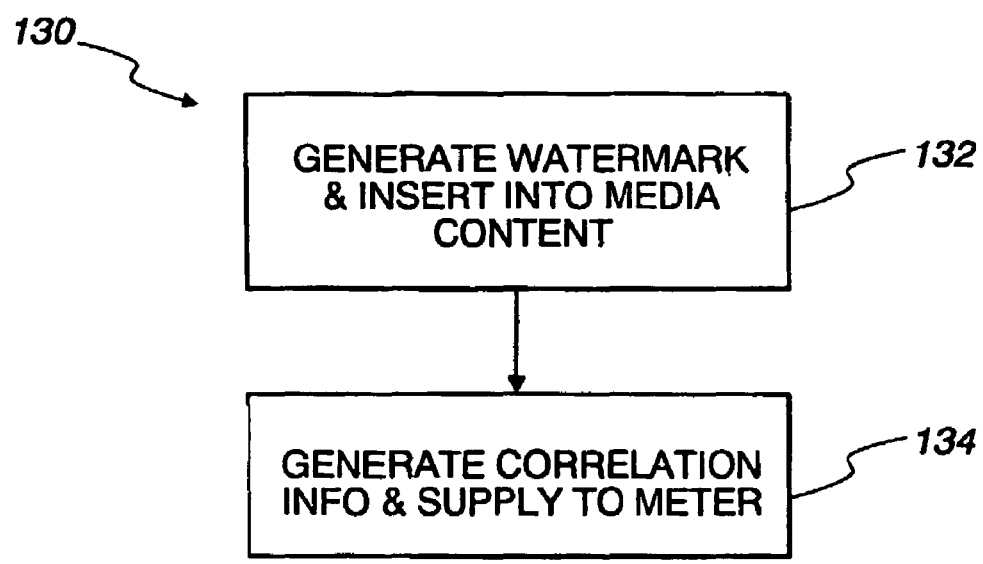
FIG. 6 is a flow chart that depicts an example method for creating a watermark that represents a particular media content and for creating correlation information that may be used to correlate the watermark with the particular media content.

Referring to FIG. 1, a home network 10 includes a plurality of media consumption devices 12, each representing one of a variety of devices including, for example, a TV, a radio, a personal computer, a personal digital assistant (PDA), a telephone and a digital video disk (DVD) player, a personal video recorder (PVR). Each of the media consumption devices 12 are adapted to receive media content from one or more different media sources collectively represented in FIG. 1 as a media content cloud 14. The content provided by the media content cloud 14 may include, for example, broadcast content, streaming or web content from the Internet, or content supplied by a local device, such as, for example, a DVD player, a video cassette recorder (VCR), a media server or any other local source. The media consumption devices 12 are in communication with each other such that media content transmitted via the home network 10 may be consumed via the media consumption devices 12, may be shared between multiple media consumption devices 12 or may be stored on a media storage database 16, also coupled to the home network 10, for later retrieval and consumption. The home network may be configured in either a wired or wireless manner. In some embodiments, the home network may include a combination of both wired and wireless communication.

To enable audience measurement, a set of content consumption metering devices 18, hereinafter "meters", are also coupled to the home network 10 and are adapted to measure the content consumed by the media consumption devices 12. Each of the meters 18 may be configured to meter a single one of the media consumption devices 12 or may be configured to meter multiple media consumption devices 12. Additionally, each meter 18 may be adapted to operate independently or each may instead be adapted to operate under the control of a master or central metering unit (not shown). The meters 18 may be coupled to the network 10 wirelessly or in a wired fashion. For example, if the meter 18 is implemented as a portable meter to be carried by a household member for purposes of measuring the consumption habits of that household member, then the meter will likely communicate with the network wirelessly. Such communication may be as limited as receiving codes from a media consumption device or may be as robust as two-way communication between the portable meter and other network devices. Audience measurement data collected by each meter 18 is supplied to a measurement collection unit 20 where the data is either analyzed or stored for later transmission to a remote data collection facility (not shown) for analysis. The measurement collection unit 20 may be disposed within the same residence as the home network 10 or may instead be disposed outside of the residence that houses the home network 10. As can be seen in FIG. 1, the meters 18 may be separate from, or integral with, the media consumption devices 12 being metered.

Referring still to FIG. 1, a set of transcoders 22 are coupled to the home network 10 at various locations and are configured to transcode or convert media content transmitted via the home network 10 between one or more formats thereby causing the media content to be suitable for consumption by one or more of the media consumption devices 12. In an example configuration, the transcoders 22 are adapted to receive media content from one or more of the media consumption devices 12, to transcode the media content and to provide the transcoded media content for consumption to one or more of the media consumption devices 12 according to a method described in greater detail below.

A home network media server 24 coupled to and in communication with the home network media storage database 16 may be adapted to control communication on the home network 10, may be adapted to function as a media content consumption device 12 and may be further adapted to receive content from the media cloud 14. The home network media server 24 may provide content to the various devices coupled to the home network 10 by streaming the content, pushing the content, allowing the content to be downloaded or by any other manner. Additionally, the home network media server 24 may act as a central repository for all of the media content that is consumed in the home network 10. Alternatively, the media content may be received at any of the media consumption devices 12 and then supplied to the home network 10 for consumption/viewing/display at any of the other media consumption devices 12.

As will be appreciated by one having ordinary skill in the art, the home network 10 may be configured in any desired manner and may include any number of network devices. Moreover, the devices coupled to the home network 10 may communicate and interface in any desired manner including, for example, using either a wired or wireless communication protocol such as HAVi, Wi-Fi, BlueTooth, IEEE 1394, DVI, HDMI or any other high speed interface protocol or using an Ethernet protocol.

Referring now to FIG. 2, in an example embodiment, each meter 18 is equipped with a processor 26 which executes a set of instructions stored in a memory 28 to control the operation of the meter 18 and a home network interface 30 that allows communication between the meter 18 and the other devices coupled to the home network 10 and that may be implemented using, for example, a software application program interface (API). As will be appreciated by one having ordinary skill in the art, the home network interface 30 may be implemented using any type of device capable of translating between a communication protocol used by the home network 10 and a communication protocol used by the processor 26 disposed in the meter 18. In addition, each meter 18 includes one or more interfaces 32a, 32b for interfacing with other devices and one or more sensors 32c-32e for sensing media content consumption. The interfaces 32a, 32b may include, for example, an interface 32a adapted to communicate with a people meter that senses the presence of one or more network users/audience members and/or a data collection interface 32b adapted to communicate with the collection measurement unit 20. The sensors 32c-32e supply sensed information to the processor 26 which processes the information and causes the information to be transmitted to the measurement collection unit 20 via the home network 10. The measurement collection unit 20 then transmits the data to a remote data collection facility (not shown) for analysis. In addition, the processor 26 is adapted to respond to queries sent by the transcoder 22 via the home network 10. Alternatively, the measurement collection unit 20 need not be coupled to the home network 10 but may instead be adapted to receive media consumption measurement data directly from the meters 18 via one or more data collection interfaces 32b, disposed in one or more of the meters 18.

The sensors 32c-32e associated with each meter 18 are adapted to sense the type of output signals supplied by a corresponding media consumption device and may be implemented using, for example, a microphone 32c for sensing audio signals, a video sensor 32d for sensing video signals, and/or a digital data sensor 32e for sensing data supplied in a digital bitstream. Due to the plurality of sensor types that may be installed in the meters 18, the meters 18 may be adapted to sense a variety of signals and may be further adapted to recognize and process a variety of codes embedded in such signals. These codes may include video based codes such as closed captioning, automated measurement of lineup (AMOL), interactive television triggers in the vertical blanking interval (VBI) of a traditional NTSC or PAL television signal, imperceptible codes in active analog/digital video, and codes included in the user data of digital video packets, to name a few. In addition, these codes may include inaudible audio codes, auxiliary data codes, digitally compressed audio packets as well as information in digital packets containing program guide information such as PSI, PSIP and A-90 data packets. Such codes may be formatted using existing broadcast standards or may instead be formatted according to standards that are currently being developed or that will be developed in the future such as, for example, the standard recently developed by the BBC and presented to TV-Anytime, the content identifier standard being developed by ATSC called Versioned ISAN (VISAN) and the standard known as AD-ID that was recently defined by the American Association of Advertising Agencies. Instead of, or in addition to, sensing signals containing codes associated with media content, one or more of the sensors may be adapted to receive signals that indicate usage of a computer software application. For example, one or more of the sensors may be adapted to monitor a computer software application that controls access to the database 16 to determine, for example, how often particular media content is being transferred into, or out of, the database 16.

The codes are transmitted as metadata via the media signal. The metadata may include a variety of information associated with the media content, such as, for example, content identification information, source identification information (SID), destination device identification information, distribution channel identification information and/or data and timestamps identifying the creation and/or transmission dates of the media content. Metadata may additionally include signal characteristics such as frequency, format, signal strength, bitrates, frame rates, and sampling frequency, to name a few. The signal format information may be used to transcode the signal from a first format to a second format to enable consumption of the signal at a consumption device that is able to recognize and process the second format.

As will be appreciated by one having ordinary skill in the art, the meters 18 may be implemented using any combination of software and hardware adapted to perform core metering functions such as receiving and processing consumption data and supplying the consumption data to a central data collection facility. As will further be appreciated by one having ordinary skill in the art, existing media consumption metering technology spans from the very simple to the complex. Yet, the present invention is not limited to use with either type of metering technology but instead may be used with a variety of meters 18 having a range of complexity. For example, the meters 18 used with the present invention may be capable of communicating via the home network 10 as well as metering media consumption or the meters 18 may instead be standalone devices that are configured to meter a particular type of media consumed via a particular type of media consumption device 12. In addition, the meters 18 may be implemented as simple, hardware based devices that collect channel tuning information or as more sophisticated, software based devices that perform intelligent data collection and processing functions.

The location of each of the meters 18 within the home network 10 depends on the type of metering to be performed. For example, if the meter 18 is adapted to perform metering by sensing a signal output by one of the media consumption devices 12, such as an audio or video signal, then the meter 18 is typically positioned near that content consumption device 12 so that it may access the signal to be metered. If, instead, the meter 18 is adapted to meter a signal supplied by the transcoder 22, then the meter 18 need not be positioned in close, physical proximity to the media consumption device 12 but must be either proximate to the transcoder 22 or arranged to remotely receive the signal output by the transcoder 22. Of course, in the latter embodiment, the meter 18 detects the flow of signals through the transcoder 22 instead of the consumption of those signals by a media content consumption device 12. Such an arrangement may be especially useful with a meter 18 adapted to detect the flow of signals through the transcoder 22 and having a software application interface (not shown) adapted to query the transcoder 22 about the media content being transcoded.

Referring to FIG. 3, the transcoder 22 of the present invention is adapted to transcode both media content and metadata transmitted with the media content and may be implemented to include a home network interface 30, an input media demultiplexer 34, a processor 36, a memory 38, an output media codec 40, an encode manager 42, and an audio/video watermark codec 44 that is adapted to detect watermarks and to encode new watermarks. The various components included in the transcoder 22 are controlled by the processor 36 which executes a set of software instructions stored in the memory 38 and each transcoder component may be implemented using software, firmware, hardware of any combination thereof. For example, commercially available devices may be used to implement any of the transcoder components provided that the functionality of each device has been modified as needed to operate as described herein. In addition, one or more of the components, such as the encode manager 42, may be implemented as software routines stored in the memory 38 and executed by the processor 36.

Referring also to FIG. 4, the transcoder 22 may be adapted to perform a method 50 that enables the transcoder 22 to transcode media content and accompanying metadata received from a first media consumption device 12 coupled to the home network 10, such as a television, and to supply the transcoded media content and accompanying metadata to a second media consumption device 12, such as a personal computer, also coupled to the home network 10. The method 50 may be performed by the various components of the transcoder 22, as described below, operating under the control of the processor 36 which executes a set of software instructions stored in the memory 38. In an example embodiment, the method 50 may begin when the transcoder 22 receives media content at the home network interface 30 (block 52). The home network interface 30 disposed in the transcoder 22 enables communication between the transcoder 22 and the other devices in the home network 10. As described with respect to the home network interface 30 disposed in the meter 18, the home network interface 30 disposed in the transcoder 22 may be implemented using any type of device capable of translating between the communication protocol used by the home network 10 and the communication protocol used by the processor 36 disposed in the transcoder 22. Also at the block 52, the home network interface 30 stores the media content in the memory 38.

After the media content has been stored in the memory 38, the input media demultiplexer 34 demultiplexes the media content to extract the metadata transmitted therewith (block 54). The media content received at the home network interface 30 need not be stored before being demultiplexed by the demultiplexer 34 but may instead be delivered by the home network interface 30 to the demultiplexer 34 as the media content arrives at the transcoder 22. The demultiplexer 34 may demultiplex the media content as it is received and then cause the demultiplexed content, i.e., the media content and the extracted metadata to be stored in the memory 38. The method 50 may then continue with the encode manager 42 examining the extracted metadata to identify a media format, "Format A", in which the media content was supplied to the transcoder 22 by the television (block 56). For example, the metadata may indicate that the media content received at the transcoder 22 is formatted as a television broadcast signal such that Format A is a standard broadcast television signal format such as, for example, an NTSC signal. In addition, the encode manager 42 examines the metadata to identify a metadata format, Format A1, in which the metadata extracted from the media content is formatted. In this example embodiment, the transcoder 22 is described as being adapted to examine the incoming media content and metadata to determine the identities of Format A and Format A1. The ability of the transcoder 22 to make such a determination is especially useful for transcoders adapted to receive media content and metadata from a variety of media consumption device types. If, instead, the transcoder 22 is configured within the home network 10 to receive media content and metadata from only a single media consumption device type, then the transcoder 22 may be pre-programmed with the identities of Format A and Format A1 such that the encode manager 42 need not determine the identities of Format A and Format A1 (block 56).

Next, the encode manager determines a media format, "Format B", associated with the second network device to which the transcoded media content shall be delivered for consumption (block 58). By way of example, the personal computer may have a Windows operating system and a Windows media player such that the media content must be supplied to the personal computer in a streaming media format suitable for display via the Windows media player. Thus, for this example, media Format B is a streaming media signal format. The encode manager 42 may be pre-programmed with the media format used by the personal computer, i.e., Format B, such that the encode manager retrieves this format information from the memory 38. Alternatively, the encode manager 42 may be configured to query the personal computer to obtain media Format B. In addition, the encode manager 42 also identifies a metadata format, Format B1, to which the extracted metadata shall be transcoded before delivery to the personal computer (block 58). Format B1 is the metadata format recognized by the meter 18 configured to measure media consumption at the personal computer. The encode manager 42 may be pre-programmed with the identity of the metadata format, Format B1, or the encode manager 42 may be adapted to obtain the identity of Format B1 from the meter 18 associated with the personal computer by performing one or more of a set of querying methods described in greater detail below.

Once the encode manager 42 has identified the applicable media formats, Formats A and B, and the applicable metadata formats, Format A1 and B1, the method continues with the encode manager 42 instructing the output media codec 40 to transcode the media content from Format A to Format B and the extracted metadata from Format A1 to Format B1 and providing the output media codec 40 with the parameters needed to perform such transcoding functions (block 60). In addition, the encode manager 42 supplies the output media codec 40 with instructions and parameters necessary for combining the transcoded metadata with the transcoded media content to form an output media signal for subsequent delivery to the personal computer. Lastly, the transcoded media signal having the transcoded metadata embedded therein is supplied by the transcoder 22 to the personal computer for consumption thereat (block 62).

As will be appreciated by one having ordinary skill in the art, methods for performing transcoding functions that convert a signal from a first media format to a second media format are well known in the art. For example, the transcoder 22 may be adapted to convert a signal containing media content from a broadcast format to any of a 1) streaming media format, 2) JPEG format, e.g., deriving a still picture from a movie for use in a digital photo frame, 3) MP3 format, e.g., playing a soundtrack to a broadcast movie, and/or 4) a digital video recorder format. Alternatively, the transcoder 22 may be adapted to convert a signal from a digital video recorder format to any of a 1) streaming media format, 2) MP3 format, and/or 3) a JPEG format. By way of further example, the transcoder 22 may be adapted to convert a signal from a streaming media format to either of a 1) JPEG format and/or 2) MP3 format. As will further be appreciated by one having ordinary skill in the art, any of these well-known transcoding techniques may be adapted to enable transcoding of the metadata from a first metadata format to a second metadata format.

As will further be appreciated by one having ordinary skill in the art, the metadata formats may be configured in a variety of different ways and, in some instances, the metadata formats may be at least partially dependent on the media format of the media content associated with the metadata. For example, if the media content associated with the metadata is provided in a broadcast television media format, then the metadata format will likely be formatted to include data fields related to broadcast television. Referring now to FIG. 5A, Format A1, if associated with a digital broadcast television media format, such as, for example, ATSC, may include a set of fields 70 for containing a variety of broadcast television signal information such as a minor channel number 72, a major channel number 74, a transport ID 76, a name of a program transmitted in the media content 78, a program number 80, a program description 82, a source ID 84, a date/time stamp 86, a transport rate 88, a video bitrate 90, an audio bitrate 92, an audio sampling rate 94, and a video frame rate 96. In this example, the minor channel number and major channel number are each 10 bits long, the transport ID is 16 bits long, the program name is represented as a sequence of one to seven 16 bit character codes coded in accordance with the Basic Multilingual Plane (BMP) of Unicode™, as specified in ISO 10646-1, the program number is 8 bits long, the program description is represented as a sequence of one to seven 16-bit character codes coded in accordance with the Basic Multilingual Plane (BMP) of Unicode™, as specified in ISO 10646-1, the source ID is 16 bits long, and the date/time stamp is a 32 bit long number in UTC format.

In contrast, metadata associated with media content that is to be supplied in a streaming media format for consumption/display at a personal computer will likely be formatted as a data header including data fields 98 for containing information about the media content in a digital data format. Thus, for example, Format B1 may include fields for containing information such as the program name 100, the program number 102, the program description 104, a source ID 106, a broadcast date/time stamp 108, a transcoded date/time stamp 110, an author 112, a device ID 114, a home ID 116, a format 118, a video bitrate 120, an audio bitrate 122, an audio sampling rate 124, and a video frame rate 126. In addition, the data fields of Format B1 may be defined to include data in a specific code or a data string having a specific number of bits. For example, the fields of Format B1 may be defined such that the program name 100 is ASCII encoded, the program number 102 is 8 bits long, the program description 104 is ASCII encoded, the source ID 106 is identical in format to the source ID of Format A, the broadcast date/time stamp 108 is the same as in the broadcast metadata, the transcoded date/time stamp 110 is a 32 bit number reflecting the date and time of transcoding by transcoder 104, the author field 112 is an ASCII representation of the user of the transcoder 104, the device ID 114 is an 8 bit ASCII encoded number identifying the transcoder 104, and the home ID 116 is a 32 bit ASCII encoded number assigned to identify the home network 10. In addition to identifying Formats A1 and B1, the encode manager 42 may be configured to generate the data contained in one or more of the fields of Format B1 including, for example, the data associated with the author 112, device ID 114, home ID 116 and format 118 fields.

The metadata format, Format B1, may also be affected by the type of meter 18 that will be used to collect the metadata for purposes of measuring consumption of the media content that is associated with the metadata. For example, if the meter 18 is configured to detect audio codes, then the metadata format, Format B1, will be suitable for insertion into an audio signal and recognition by an audio code meter and/or if the meter is configured to detect video codes, then the metadata format, Format B1, will be suitable for insertion into a video signal and recognition by a video code meter. Likewise, if the meter 18 is configured to detect digital data, then the metadata format, Format B1, will be suitable for insertion into a digital data stream and detection by a digital data sensor.

The transcoding capabilities of the transcoder 22 may also vary depending upon the position of the transcoder 22 within the home network 10. For example, if the transcoder 22 is positioned to receive input from multiple media consumption devices 12 and to provide transcoded media content to multiple media consumption devices 12, then the transcoder 22 will likely be adapted to transcode media content between the multiple formats used by the media consumption devices 12 coupled thereto. Alternatively, if the transcoder 22 is positioned to receive input from a single media consumption device 12 and to supply transcoded media content to a single media consumption device 12, then the transcoder 22 need only be adapted to transcode between the media formats used by the two media consumption devices 12 configured to supply/receive media content to/from the transcoder 22.

Referring now to FIG. 6, depending on the capabilities of the meter 18 associated with the second network device, e.g., the personal computer, and whether one or more conditions are satisfied, as is described in greater detail below, the method 50 may be expanded to include a sub-method, identified generally with reference numeral 130, for causing the audio/video watermark codec 44 to insert a watermark into the media content in a manner that causes the inserted watermark to be imperceptible to the human senses so that the inserted watermark does not interfere with the consumption of the media content at the personal computer. In such an arrangement, the encode manager 42 may use the metadata associated with the media content to identify the media content and then cause the audio/video watermark codec 44 to generate a watermark that uniquely represents that media content and to insert the watermark into the transcoded media content (block 132). Next, the transcoder 22 supplies information that correlates the identity of the media content with the unique watermark to the meter 18 which may be adapted to transmit this correlation information directly to a remote data collection facility (not shown) or via the measurement collection unit 20 (see FIG. 1) (block 122). Alternatively, the transcoder 22 may be adapted to supply this correlation information directly to the measurement collection unit 20 via the home network 10. When the media content having the inserted watermark is consumed at the personal computer, and the meter 18 associated with the personal computer extracts the watermark and reports the presence of the watermark to the measurement collection unit 20 or the remote data collection facility, the data collection facility may use the correlation information to determine the identity of the consumed media content based on the reporting of the unique watermark.

Referring again to FIG. 1, it should be understood that not all of the transcoding functions need to be performed by a single network component but may instead be performed by any of the consumption devices 12, or any other network device or combination of network devices, provided that such devices are adapted to perform the transcoding functions described herein. For example, the transcoder 22 may be configured to demultiplex an incoming media content signal to separate the metadata contained in the signal from the programming or other media content as described with respect to FIGS. 3 and 4. Alternatively, a media consumption device 12 may be configured to perform this demultiplexing function such that the metadata extracted thereby is transmitted to the transcoder 22 separately from the media content. Likewise, any of the media consumption devices 12 may be configured to decode or otherwise process the media content signal before the signal is transmitted to the transcoder 22. For example, any of the media consumption devices 12 may be configured to receive and demodulate/downconvert a digitally compressed broadcast signal provided in an ATSC, DVB or MPEG format via an RF transmission. Any of the media consumption devices 12 may further be configured to include a demultiplexer that demultipexes the demodulated bitstream to obtain a set of elementary components, including an elementary video stream, an elementary audio stream and the metadata transmitted in the broadcast. The elementary video and audio streams may then be decoded by an MPEG/AC3 audio decoder and an MPEG video decoder, respectively, both of which may also be disposed in any of the media consumption devices 12. The decoded video and audio streams may subsequently be transmitted to the transcoder 22 for transcoding in accordance with the blocks 56-62 of the method 50 shown in FIG. 4 described above. After the transcoding has been performed, the transcoder 22 may be adapted to yield a streaming media signal that may be delivered to one of the media consumption devices 12 configured to consume/display streaming media or may instead be stored in the memory 16 by the server 24 for consumption at a later time. In addition, the meter 18 used to meter the media consumption device 12 at which the streaming media is consumed may be configured to receive the transcoded metadata directly from the transcoder 22 or may instead be configured to extract the transcoded metadata embedded in the streaming media signal delivered by the transcoder 22 as it is consumed by the media consumption device 12.

Referring still to FIG. 1, in an embodiment in which the transcoder 22 supplies the transcoded metadata directly to a first meter 18, the transcoder 22 may be disposed in or in communication with a second meter 18 configured to meter consumption at a media consumption device 12. The second meter 18 may be implemented using, for example, a set top box 18 that is configured to meter consumption of television programming via, for example, a television 12. In this embodiment, the set top box 18 collects metadata as the corresponding television programming is consumed at the television 12. The set top box 18 then supplies the collected metadata to the transcoder 22 which transcodes the metadata from the first format, Format B1, to the second format, Format B2, suitable for delivery to and reception at the first meter 18. The transcoder 22 may be integrated with the set top box 18, disposed within the set top box 18, or separate from but in communication with the set top box 18. The first meter 18 may be implemented using, for example, a portable meter 18 designed to collect audio codes or designed to collect data transmitted wirelessly using any wireless protocol. Of course, if the first meter 18 is designed to receive data wirelessly using a wireless protocol such as Bluetooth, then the transcoder 22 will be configured to transcode the metadata to a Bluetooth format and the second meter 18 will be configured to transmit the data in Bluetooth format. The portable meter 18 may be configured to be carried by a household member for purposes of metering that household member's viewing habits. The portable meter 18 may additionally be configured to meter media consumption by that household member that occurs out of the home by detecting audio codes emitted by media consumption devices 12 disposed outside the home and may be configured to detect media consumption within the home by wireless reception of transcoded metadata from the set top box 18 as described above. Alternatively, the portable meter 18 may be designed to detect audio codes emitted by the television 12 as well as metadata transcoded and transmitted by the set top box 12 such that the portable meter 18 receives two sets of data representing the same viewing event while disposed in the home. These two data sets may then be compared for consistency to increase confidence in the accuracy of the data. Of course, the two data sets must be treated such that the sets are only counted as a single viewing event. In another example embodiment, the set top box 18 may configured to supplement the code capturing capabilities of the portable meter 18 by detecting codes that are not detectable by the portable meter 18, by transcoding such codes to a format suitable for detection by the portable meter 18 and by then supplying the transcoded codes to the portable meter 18. In such an embodiment, the portable meter 18 may be designed to detect a first type of code such as an SID, emitted by the television 12, but not a second type of code, such as a time stamp. The set top meter 18 may be designed to detect either or both of the first and second types of code. For example, the set top meter 18 may detect the SID and the time stamp emitted by the television 12 and may transcode the SID and timestamp to a format suitable for reception/processing by the portable meter 18. Thereafter, the set top meter 18 may transmit one or both of the transcoded time stamp and SID to the portable meter 18 via, for example, radio frequency signals, infra-red signals, Wi-Fi signals, audio signals, etc. Of course, the set top and portable meters 18 will have to be equipped to communicate using such signals.

The transcoder 22 may be pre-programmed with the identity of Format A1 and Format B1 such that the transcoder 22 may automatically convert metadata received at the transcoder from Format A1 to Format B1. In fact, such an arrangement may be preferred when the transcoder 22 is adapted to receive media in a single format only and to transmit data in a single format only. Alternatively, referring also to FIG. 7A, as mentioned above, the transcoder 104 may be adapted to perform a variety of methods to query one or more networked meters 18 for information about the detection capabilities of the meters 18 so that the format in which the metadata is to be supplied to the meters 18, i.e., Format B1, can be determined. For example, one such method 140 may comprise a set of submethods, each submethod designed to test for the presence of a different type of sensor. The first such submethod 142 may test for the presence of an audio sensor capable of sensing audio watermarks and may begin when the transcoder 22 queries the meter 18 to determine whether it includes an audio watermark sensor (block 144). If the meter 18 responds to the query in the negative, i.e., the meter 18 does not have an audio watermark sensor, then the transcoder 22 bypasses the remainder of the submethod 142 and instead proceeds to additional submethods for testing whether the meter 18 includes one or more other types of sensors as described in greater detail below with reference to FIGS. 7B and 7C.

If instead, in response to the query performed at the block 64, the meter 18 responds in the positive, i.e., the meter 18 does have an audio watermark sensor, then the submethod 62 continues with the transcoder 22 determining whether an audio watermark has been detected in the media content supplied to the transcoder 22 for transcoding (block 146). If an audio watermark is not detected in the media content, then the transcoder 22 creates a new audio watermark and causes the new audio watermark to be embedded into the media content (block 148). As will be appreciated by one having ordinary skill in the art, the audio/video watermark codec 44 may be configured to detect the presence of an audio watermark supplied in the media content and to create a new audio watermark for insertion in the content. Moreover, the capabilities and functionality of a standard audio/video watermark codec are well known in the art are not described further herein. The transcoder 22 may also cause all or a portion of the submethod 130, described with respect to FIG. 6, to be performed thereby causing correlation information to be generated and transmitted to the measurement collection unit 20 and/or a remote data collection facility where it may be used to correlate the watermark to the program or other content it represents.

If an audio watermark has been detected at the block 146, then the transcoder 22 determines whether the audio watermark, if inserted into the signal to be output by the transcoder 22, will survive the compression performed by the output media codec 40 (block 150). Specifically, the output media codec 40 is adapted to compress the media content signal having the inserted watermark before the signal is transmitted via the home network 10. The output media codec 40 compresses the signal by suppressing one or more of the signal frequencies. However, watermarks are created by modulating a particular set of signal frequencies in a manner such that the modulated frequencies uniquely represent a particular program or other media content. Thus, the compression performed by the output media codec 40, may cause one or more of the frequencies modulated to create the watermark to be suppressed thereby causing the audio watermark to be unrecoverable by the meter 18. The transcoder 22 may be adapted to perform a variety of methods for determining whether the watermark will survive compression by the output media codec 40. For example, the transcoder 22 may cause the output media codec 40 to insert the watermark into the media content and the resulting signal may be processed by the transcoder 22, in much the same way an input signal would be processed, to determine whether the audio watermark is recoverable. In another embodiment, the transcoder 22 may be pre-programmed with information pertaining to signal compression ratios that the watermark will be able to withstand/survive. Specifically, before inserting a particular watermark into a media content signal, the watermark may be tested to determine a range of suitable signal compression ratios, i.e., compression ratios that the watermark will survive. These suitable ratios may then be provided to the manufacturers/developers of the transcoder 22 and used to pre-program the transcoder 22 so that when watermarks are encountered, the transcoder 22 may use the pre-programmed information to compare to the ratio used by the output media codec 40 to determine whether the compression ratio used by the output media codec 40 is suitable inserting and for transmitting the watermark in a recoverable, distortion-free manner. In a still further embodiment, information about suitable compression ratios may be transmitted with the signal containing the watermark and extracted from the signal by the transcoder 22 for use in determining whether the watermark will survive the compression ratio used by the output media codec 40. If the audio watermark will survive, then the sub method 142 causes the output media codec 40 to insert the watermark (block 152) (if it is not already inserted) after which the submethod 142 is complete and the method 140 continues at another submethod described below with respect to FIG. 7B and FIG. 7C.

If, at the block 150, the transcoder 22 determines that the compression ratio used by the output media codec 40 is not suitable, i.e., will cause the watermark to be unrecoverable, then the transcoder 22 may decrease the compression ratio by a desired amount. As will be understood by one having ordinary skill in the art, the compression ratio refers to the ratio of the data in the uncompressed signal to the data in the compressed signal. In addition, the signal compression ratio is inversely related to the output bit rate, i.e., as the compression ratio decreases, the output bit rate increases. Thus, if the compression ratio is too high and would cause the watermark to be unrecoverable, then the transcoder 22 may decrease the compression ratio of the output media codec 40 by increasing the output bit rate of the output media codec 40 by a desired amount such as, for example, 30 Kb/sec (block 154). After increasing the output bit rate, the transcoder 22 determines whether the new, increased output bit rate exceeds the maximum allowable bit rate supported by the home network 10 (block 156). As will be appreciated by one having ordinary skill in the art, if the bit rate is higher than that supported by the home network 10, then the home network 10 may not be able to carry the signal without causing it to be distorted. As a result, the transcoder 22 decreases the output bit rate to a value that is within the bandwidth of the home network 10 (block 158), and the submethod 142 returns to the block 148 at which a new audio watermark is created and inserted into the media content, as described above. As is also described above, when the transcoder 22 causes the output media codec 40 to create a new audio watermark the transcoder 22 may also perform all or a portion of the submethod 130 shown in FIG. 6, for causing correlation information to be created and transmitted to the meter 18 for reporting to the remote data collection facility (not shown).

If, the output bit rate does not exceed the maximum rate supported by the home network 10 (block 156), then the submethod 142 returns to the block 150, and the blocks subsequent thereto, at which the transcoder 22 again tests to determine whether the codec compression ratio is suitable for transmission of the watermark, as described above.

Figure 7B:
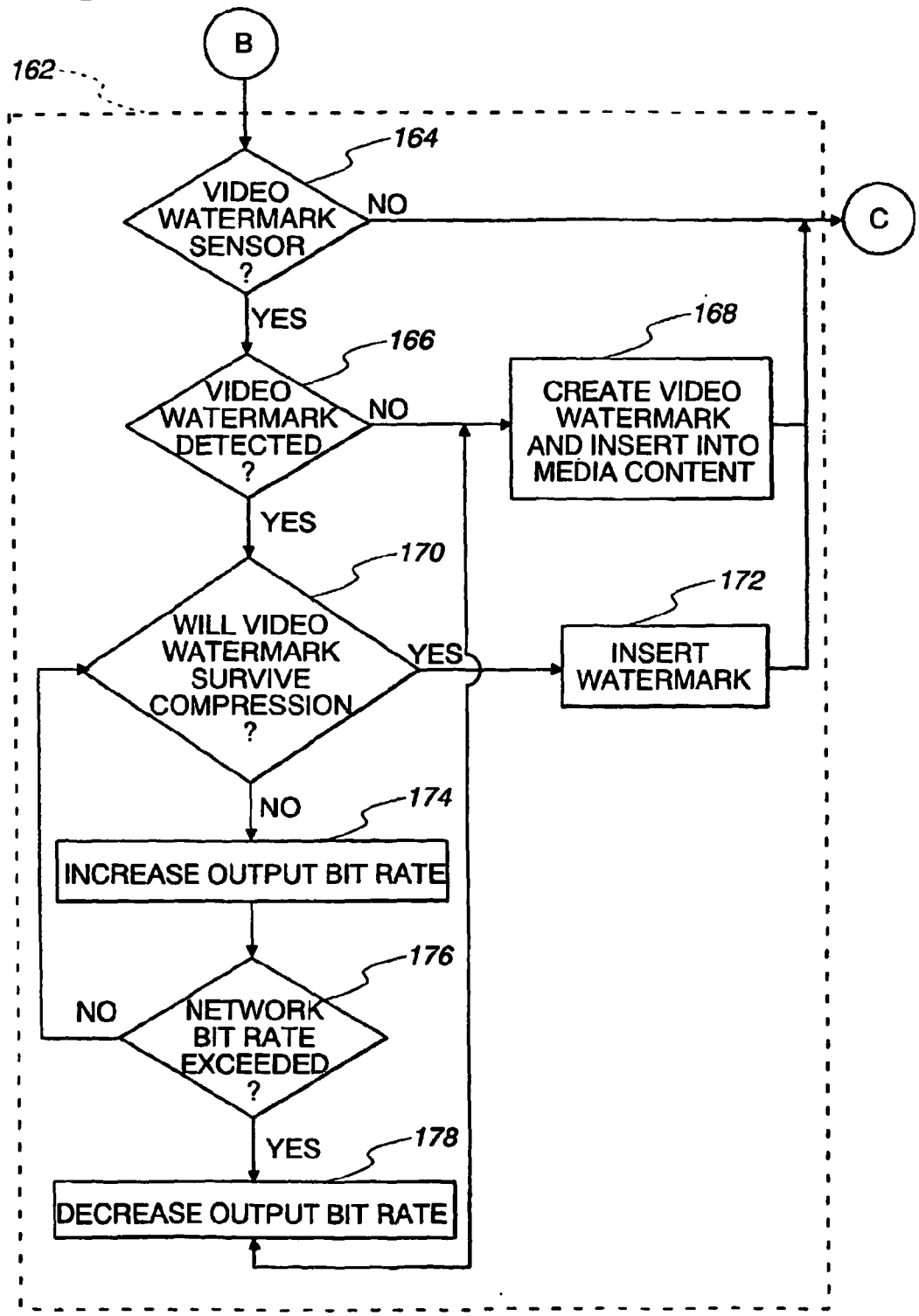

Referring also to FIG. 7B, which includes a continuation of the flow chart of FIG. 7A as indicated by the alignment points A, after performing the submethod 142 for detecting the presence of an audio watermark sensor, a submethod 162 for determining whether the meter has a sensor capable of sensing an video watermark may be performed. The submethod 162 for detecting the presence of a video watermark sensor begins when the transcoder 22 queries the meter 18 to determine whether it includes a video watermark sensor (block 164). If the meter 18 responds to the query in the negative, i.e., the meter 18 does not have a video watermark sensor, then the transcoder 22 proceeds to additional submethods for testing whether the meter includes one or more other types of sensors as described in greater detail below with reference to FIG. 7C. If instead, in response to the query performed at the block 164, the meter 18 responds in the positive, i.e., the meter 18 does have a video watermark sensor, then the submethod 162 continues with the transcoder 22 querying the meter 18 to determine whether a video watermark has been detected in the media content supplied to the transcoder 22 for transcoding (block 166). If a video watermark is not detected in the media content, then the submethod 162 may continue at a block 168 at which the transcoder 22 creates a new video watermark and causes the new video watermark to be inserted into the media content. As discussed above, the capabilities and functionality of a standard audio/video watermark codec are well known in the art and are not described further herein. The transcoder 22 may also cause all or a portion of the submethod 130, described with respect to FIG. 6, to be performed thereby causing correlation information to be generated and transmitted to the measurement collection unit 20 and/or a remote data collection facility (not shown) where it may be used to correlate the watermark to the program or other content it represents.

If a video watermark has been detected at the block 166, then the transcoder 22 determines whether the video watermark, if inserted into the signal to be output by the transcoder 22, will survive the compression performed by the output media codec 40 (block 170). Specifically, the output media codec 40 is adapted to compress the media content signal having the inserted watermark before the signal is transmitted via the home network 10. The output media codec 40 compresses the signal by suppressing one or more of the signal frequencies. However, watermarks are created by modulating a particular set of signal frequencies in a manner such that the modulated frequencies uniquely represent a particular program or other media content. Thus, the compression performed by the output media codec, may cause one or more of the frequencies modulated to create the watermark to be suppressed thereby causing the video watermark to be unrecoverable by the meter 18. The transcoder 22 may be adapted to perform a variety of methods for determining whether the watermark will survive compression by the output media codec 40. For example, the transcoder 22 may cause the output media codec 40 to insert the watermark into the media content and the resulting signal may be processed by the transcoder 22, in much the same way that an input signal is processed, to determine whether the video watermark is recoverable. In another embodiment, the transcoder 22 may be pre-programmed with information pertaining to signal compression ratios that the watermark will be able to withstand/survive. Specifically, before inserting a particular watermark into a media content signal, the watermark may be tested to determine a range of suitable signal compression ratios, i.e., compression ratios that the watermark will survive. These suitable ratios may then be provided to the manufacturers/developers of the transcoder 22 and used to pre-program the transcoder 22 so that when watermarks are encountered, the transcoder 22 may use the pre-programmed information to compare to the compression ratio of the output media codec 40 to determine whether the compression ratio used by the output media codec 40 is suitable for inserting and transmitting the watermark in a recoverable, distortion-free manner. In a still further embodiment, information about suitable compression ratios may be transmitted with the signal containing the watermark and extracted from the signal by the transcoder 22 for use in determining whether the watermark will survive the compression ratio used by the output media codec 40. If the video watermark will survive compression, the submethod 162 causes the output media codec 40 to insert the watermark (block 172) into the media content (if it is not already inserted) after which the submethod 162 is complete and the method 140 continues at another submethod described below with respect to FIG. 7B and FIG. 7C.

If, at the block 170, the transcoder 22 determines that the compression ratio of the output media codec 40 is not suitable, i.e., will cause the watermark to be unrecoverable, then the transcoder 22 may decrease the compression ratio by a desired amount. As will be understood by one having ordinary skill in the art, the compression ratio refers to the ratio of the quantity of data in the uncompressed signal to the quantity of data in the compressed signal. In addition, the signal compression ratio is inversely related to the output bit rate, i.e., as the compression ratio decreases, the output bit rate increases. Thus, if the compression ratio is too high and would cause the watermark to be unrecoverable, then the transcoder 22 may decrease the compression ratio of the output media codec 40 by increasing the output bit rate of the output media codec 40 by a desired amount such as, for example, 30 Kb/sec (block 174). After increasing the output bit rate, the transcoder 22 determines whether the new, increased output bit rate exceeds the maximum allowable bit rate supported by the home network 10 (block 176). As will be appreciated by one having ordinary skill in the art, if the bit rate is higher than that supported by the home network 10, then the home network 10 may not be able to carry the signal without causing it to be distorted. As a result, the transcoder 22 decreases the output bit rate to a value that is within the bandwidth of the home network 10 (block 178), and the submethod 162 returns to the block 168 at which a new video watermark is created for insertion into the media content, as described above. As is also described above, the block 168 at which the transcoder 22 causes the output media codec 40 to create a new video watermark may also include all or a portion of the submethod 130 shown in FIG. 6, for causing correlation information to be created and transmitted to the meter 18 for reporting to the remote data collection facility (not shown).

If, at the block 176, the output bit rate does not exceed the maximum rate supported by the home network 10, then the submethod 162 returns to the block 170, and the blocks subsequent thereto, at which the transcoder 22 again tests to determine whether the codec compression ratio is suitable for transmission of the watermark, as described above.

In addition to testing for the presence of an audio watermark sensor and a video watermark sensor, the transcoder 22 may be adapted to query the 18 meter to determine whether it includes other types of sensors as well, such as digital sensors, database sensors and/or software sensors. Specifically, with reference also to FIG. 7C which includes a continuation of the flow chart of FIGS. 7A and 7B as indicated by the alignment points B, such a submethod 200 may begin with the transcoder 22 querying the meter 18 to determine whether it includes a sensor capable of parsing a digital bitstream to decode metadata embedded in the stream (block 202). If the meter 18 responds that it does include such a digital sensor, then the transcoder 22 causes the output media codec 40 to encode the metadata received with the media content into the desired format (block 204) and to digitally insert the encoded metadata into the bitstream of the transcoded media content to be output by the transcoder (block 206).

If the meter 18 indicates that it does not include a digital sensor (block 202), then the method continues at a submethod 210 at which the transcoder 22 queries the meter 18 to determine whether it includes a database sensor, i.e., a sensor that can identify when media content is being read from a media database (block 212). If such a database sensor is present, then the submethod 200 continues with the transcoder 22 transcoding the metadata, embedding the transcoded metadata in the transcoded media content and then causing the media content to be stored in a media database (block 214).

If, at the block 212, a database meter is not detected, then the method continues at a submethod 216 for determining whether the meter 18 includes a software sensor adapted to extract metadata from a media consumption device using software APIs associated with the consumption device, e.g. DASE/MHP API (block 218). If such a software sensor is detected, then the transcoder 22 causes the output media codec 40 to format the metadata in a manner suitable for extraction by the software sensor and to embed the metadata into the transcoded media signal that is output by the transcoder 22 (block 220).

If a software sensor is not detected, then the transcoder 22 may query the home network 10 for the presence of other meters 18 that are configured to meter the consumption device to which the transcoder 22 supplies transcoded media content (block 222). If another meter 18 is detected, then the transcoder 22 may return to the beginning of the method 140 and cause it to be performed again with respect to the newly detected meter 18. If another meter is not detected, then the transcoder 22 may forego repeating the method 140.

As described, the method 140 for querying a meter 18 to determine the sensing capabilities of the meter 18 actually comprises a set of sub-methods each adapted to query the meter 18 for a specific type of sensor. Although the submethods are described as being performed in a specific order, the sub-methods may actually be performed in any desired order. Likewise, the submethods may be performed in parallel instead of serially. In addition, the transcoder 22 need not be configured to perform all of the submethods of FIGS. 7A-7C but may instead be configured to perform any combination of a subset of these sub-methods. Moreover, the transcoder 22 may be configured to perform any number of additional sub-methods as necessary to determine the sensing capabilities of the meter 18 so that the metadata may be formatted accordingly.

The querying methods described above need not be performed at all if the transcoder 22 is pre-programmed with information about the sensing capabilities of the meter 18. In such an embodiment, the meters 18 need not be capable of communicating via the home network 10 and need not even be coupled to the home network 10. Instead, the meters 18 need only be capable of metering consumption at a media consumption device 12.

Depending on whether frequent changes to the configuration of the home network 10 are anticipated, the transcoder 22 may be adapted to perform the method 140 every time new media content is received or only a single time, e.g., upon installing the transcoder 22 in the home network 10. Alternatively, the transcoder 22 may be adapted to query for sensor types only after the home network 10 has been reconfigured. Of course, all or portions of the submethods 142 and 162 for detecting the presence of an audio watermark sensor and a video watermark sensor, respectively, may need to be performed every time media content is supplied since at least portions of the submethods 142 and 162 operate to test for the presence of an audio watermark or a video watermark supplied with the media content.

Figure 7C:
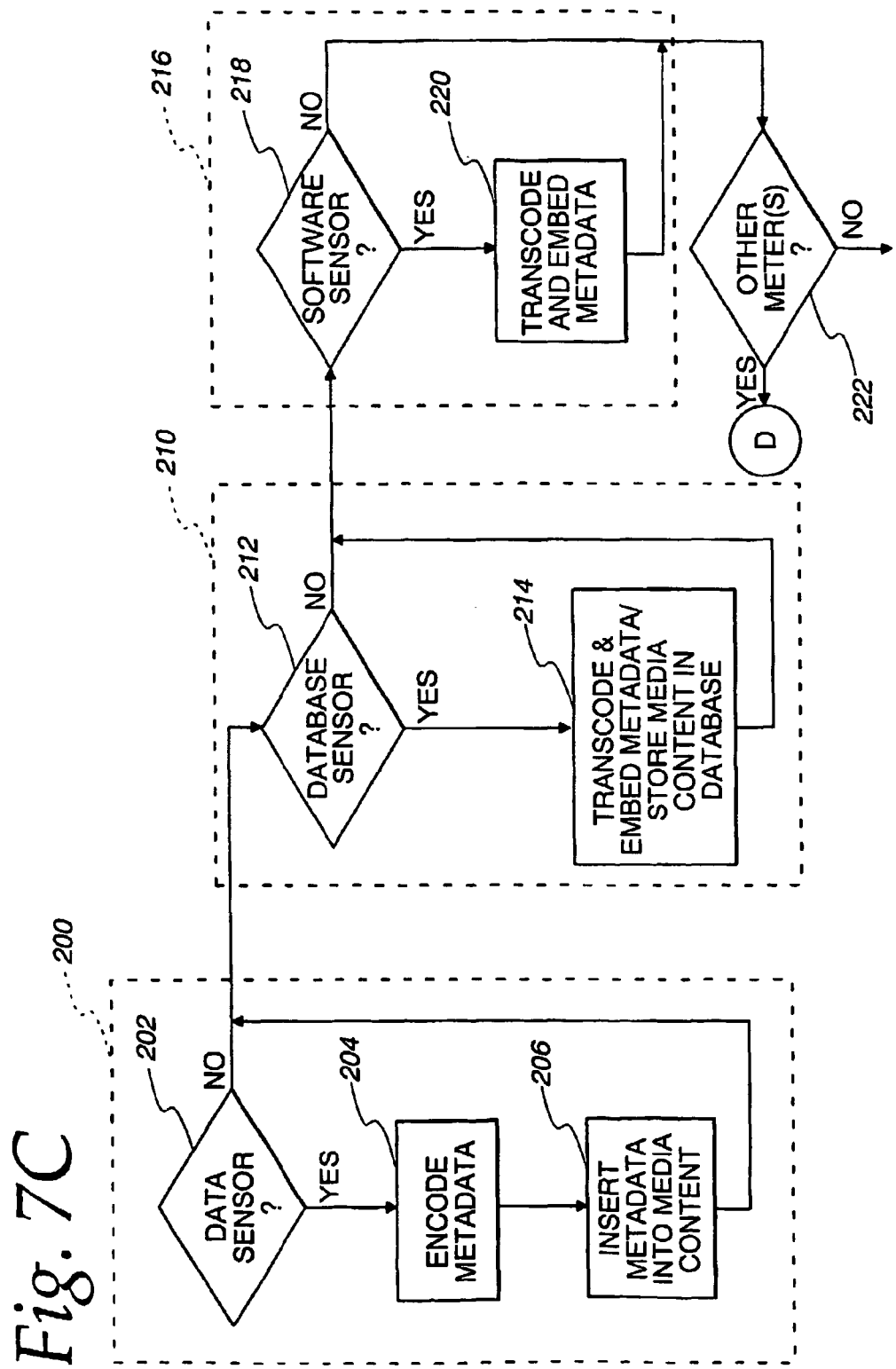

The submethods of FIGS. 7A, 7B and 7C are described as including blocks at which the transcoder 22 determines whether a particular type of sensor is detected and, if such a sensor type is detected, then causes the metadata to be transcoded in a manner suitable for detection by that sensor type, and then proceeds to perform tests for a different type of sensor. However, the submethods may instead be structured such that the transcoder first detects the presence (or absence) of each type of sensor and then, after each sensor type has been detected, causes the metadata to transcoded in a manner suitable for the detected sensor types. In addition, the metadata may be transcoded into more than one metadata format thereby enabling detection by more than one type of sensor.

As described herein, the media content and its corresponding metadata received at the transcoder 22 are stored in the memory device 38 and accessed by the various transcoder components for purposes of transcoding the media content and metadata. Instead, the transcoder 22 may include a plurality of memory devices arranged as registers associated with the various components of the transcoder 22 between which the data may be transferred. Alternatively, the transcoders 22 may be adapted to process and store the media content and metadata in any desired manner.

The home network 10, although described as being disposed within a home residence, may instead be disposed at any type of location and may be configured to enable communication between network devices located at any number of different locations. For example, the home network 10 may be installed in a place of business or at any public location. Any network that enables communication between multiple media consumption devices is sufficient to qualify as a "home network," as that term is used herein.

As will be appreciated by one having ordinary skill in the art, if the consumption device 12 is metered using only a single meter 18 and that single meter 18 is limited to signature sensing only, then any metadata extracted from the media content need not be transcoded at the trancoder 22 because signature metering involves capturing signal characteristic information, i.e., signature information, and does not involve the extraction of codes. Thus, the querying method 60 of FIGS. 7A-7C does not illustrate querying for the presence of a signature sensor. Or, as is more often the case, a consumption device 12 may be metered using multiple meters, one of which is capable of sensing signatures. In a system configured in this manner, metadata transcoding will likely be required as signature sensing is more often used as a back up sensing mechanism instead of a primary sensing mechanism. Thus, the transcoders 22 will not typically be configured to forego metadata transcoding functions upon the detection of a meter 18 having signature sensing capabilities.

The transcoder 22 may additionally be adapted to query the media content consumption device 12 that supplies media content to the transcoder 22 for identification purposes such as, for example, device type and/or model information and the transcoder 22 may then transmit this identifying information to the meter 18 configured to measure consumption at the media consumption device to which the transcoder delivers the transcoded media content.

While the present invention has been described with respect to several embodiments, it is to be understood that the invention is not limited to these disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method to meter media presented by a media device, the method comprising:
    accessing first metadata accompanying media to be presented by the media device, the first metadata conveying a first identifier, the first metadata in a first format not detectable by a meter collecting audience measurement data associated with the media device;
    transcoding the first metadata into second metadata that is to convey the first identifier, the second metadata to be associated with the media, the second metadata being transcoded to have a second format that is different from the first format, the second metadata having the second format being detectable by the meter and supported by an application programming interface (API) provided by the media device, the API being accessible by the meter; and
    communicating the second metadata having the second format in a second transmission for receipt by the meter via the API provided by the media device, the second transmission being separate from a first transmission communicating the media and the first metadata having the first format, but the first transmission not communicating the second metadata having the second format different from the first format, to the media device.

2. The method of claim 1, wherein the first metadata corresponds to at least one of an audio watermark or a video watermark.

3. The method of claim 2, wherein the second metadata corresponds to digital data formatted according to a data communications protocol.

4. The method of claim 3, wherein the digital data includes a plurality of data fields.

5. The method of claim 4, further including inserting first information in a first one of the plurality of data fields, the first information corresponding to second information conveyed by the first metadata.

6. The method of claim 5, wherein the first information corresponds to the first identifier conveyed by the first metadata.

7. The method of claim 1, wherein the first transmission is communicated via a first communication medium, and the second transmission is communicated via a wireless communication medium different from the first communication medium.

8. A machine readable storage device or storage disk comprising machine readable instructions which, when executed, cause a machine to at least:
    access first metadata accompanying media to be presented by a media device, the first metadata conveying a first identifier, the first metadata in a first format not detectable by a meter collecting audience measurement data associated with the media device;
    transcode the first metadata into second metadata that is to convey the first identifier, the second metadata to be associated with the media, the second metadata being transcoded to have a second format that is different from the first format, the second metadata having the second format being detectable by the meter and supported by an application programming interface (API) provided by the media device, the API being accessible by the meter; and communicate the second metadata having the second format in a second transmission for receipt by the meter via the API provided by the media device, the second transmission to be separate from a first transmission that is to communicate the media and the first metadata having the first format, but the first transmission not to communicate the second metadata having the second format different from the first format, to the media device.

9. The storage device or storage disk of claim 8, wherein the first metadata corresponds to at least one of an audio watermark or a video watermark.

10. The storage device or storage disk of claim 9, wherein the second metadata corresponds to digital data formatted according to a data communications protocol.

11. The storage device or storage disk of claim 10, wherein the digital data includes a plurality of data fields.

12. The storage device or storage disk of claim 11, wherein the instructions, when executed, further cause the machine to include first information in a first one of the plurality of data fields, the first information corresponding to second information conveyed by the first metadata.

13. The storage device or storage disk of claim 12, wherein the first information corresponds to the first identifier conveyed by the first metadata.

14. The storage device or storage disk of claim 8, wherein the first transmission is communicated via a first communication medium, and the second transmission is communicated via a wireless communication medium different from the first communication medium.

15. A transcoder comprising:

memory;

a processor in communication with the memory, the processor to:

access first metadata accompanying media to be presented by a media device, the first metadata conveying a first identifier, the first metadata in a first format not detectable by a meter collecting audience measurement data associated with the media device;

transcode the first metadata into second metadata that is to convey the first identifier, the second metadata to be associated with the media, the second metadata being transcoded to have a second format that is different from the first format, the second metadata having the second format being detectable by the meter and supported by an application programming interface (API) provided by the media device, the API being accessible by the meter;

cause the second metadata having the second format to be communicated in a second transmission for receipt by the meter via the API provided by the media device, the second transmission to be separate from a first transmission that is to the media and the first metadata having the first format, but the first transmission not to communicate the second metadata having the second format different from the first format, to the media device for presentation; and a codec to provide the media to the media device.

16. The transcoder of claim 15, wherein the first metadata corresponds to at least one of an audio watermark or a video watermark.

17. The transcoder of claim 16, wherein the second metadata corresponds to digital data formatted according to a data communications protocol.

18. The transcoder of claim 17, wherein the digital data includes a plurality of data fields, and the processor is further to include first information in a first one of the plurality of data fields, the first information corresponding to second information conveyed by the first metadata.

19. The transcoder of claim 18, wherein the first information corresponds to the first identifier conveyed by the first metadata.

20. The transcoder of claim 15, wherein the first transmission is communicated via a first communication medium, and the second transmission is communicated via a wireless communication medium different from the first communication medium.

* * * * *